United States Patent [19]

Bigham et al.

[11] Patent Number: 5,684,799
[45] Date of Patent: *Nov. 4, 1997

[54] FULL SERVICE NETWORK HAVING DISTRIBUTED ARCHITECTURE

[75] Inventors: John A. Bigham, Pottstown, Pa.; Dave Little, Columbia, Md.; Edward C. Mihm, Warminster, Pa.; Kamran Sistanizadeh, Arlington, Va.; Bahman Amin-Salehi, Washington, D.C.; Alpna Jain, Falls Church, Va.; Regina Lightfoot, New Carrollton, Md.; Ulric E. Arthur, Burtonsville, Md.

[73] Assignee: Bell Atlantic Network Services, Inc., Arlington, Va.

[*] Notice: The term of this patent shall not extend beyond the expiration date of Pat. No. 5,544,161.

[21] Appl. No.: 413,215

[22] Filed: Mar. 28, 1995

[51] Int. Cl.$^6$ ................................................ H04J 3/24
[52] U.S. Cl. .................. 370/397; 370/352; 370/474; 348/7; 455/5.1
[58] Field of Search ............................. 370/94.2, 94.1, 370/60, 60.1, 58.1, 112, 389, 397, 352, 539, 474; 455/4.1, 4.2, 5.1; 348/7, 12, 14, 13

[56] References Cited

U.S. PATENT DOCUMENTS

| | | | |
|---|---|---|---|
| 4,506,387 | 3/1985 | Walter | 455/612 |
| 4,949,187 | 8/1990 | Cohen | 358/335 |
| 4,963,995 | 10/1990 | Lang | 358/335 |
| 5,027,400 | 6/1991 | Baji et al. | 380/20 |
| 5,057,932 | 10/1991 | Lang | 358/335 |
| 5,130,792 | 7/1992 | Tindell et al. | 358/85 |
| 5,132,992 | 7/1992 | Yurt et al. | 375/112 |
| 5,133,079 | 7/1992 | Ballantyne et al. | 455/4.1 |
| 5,136,411 | 8/1992 | Paik et al. | 359/125 |
| 5,218,602 | 6/1993 | Grant et al. | 370/58.2 |
| 5,220,420 | 6/1993 | Hoarty et al. | 358/86 |
| 5,231,494 | 7/1993 | Wachob | 358/146 |
| 5,247,347 | 9/1993 | Litteral et al. | 358/85 |
| 5,253,275 | 10/1993 | Yurt et al. | 375/112 |
| 5,467,342 | 11/1995 | Logston et al. | 370/60.1 |
| 5,532,735 | 7/1996 | Blahat et al. | 455/5.1 |
| 5,539,920 | 7/1996 | Menand et al. | 455/5.1 |
| 5,544,161 | 8/1996 | Bigham et al. | 370/58.1 |
| 5,559,808 | 9/1996 | Kostreaki et al. | 370/112 |

Primary Examiner—Douglas W. Olms
Assistant Examiner—Shick Hom
Attorney, Agent, or Firm—Lowe, Price, LeBlanc & Becker

[57] ABSTRACT

A video distribution network having an architecture that distributes video services over a greater serving area. The broadcast consolidation section receives broadband data from a plurality of information providers, preferably as compressed, digital signals using asynchronous transfer mode ATM transport. The broadcast consolidation section combines the ATM streams from different information providers and outputs a consolidated signal onto a transport ring. The broadcast ring supplies the consolidated broadcast signal to a plurality of video network hubs, each of which downloads the consolidated broadcast data, converts the consolidated broadcast data to motion picture experts group MPEG data on an RF carrier, and combines the RF signal with other RF signals before transmission by optical fiber to a plurality of local video access nodes. Each local video access node combines the RF broadcast data from the corresponding video network hub with downstream interactive multimedia television IMTV traffic supplied by an ATM backbone subnetwork. The combined RF signals are output from the local video access nodes to the access subnetwork servicing these subscribers. The architecture of the present invention provides sufficient allocation of resources, while at the same time providing efficient transport of signaling traffic and interactive data. In addition, the network control is centralized for more efficient management of resources.

39 Claims, 6 Drawing Sheets

FULL SERVICE NETWORK HAVING DISTRIBUTED ARCHITECTURE

TECHNICAL FIELD

The present invention relates to full service digital broadband networks offering a full range of digital communications by transporting compressed, digital information using Asynchronous Transfer Mode (ATM) backbone transport and RF distribution over a hybrid-fiber-coax local loop distribution.

BACKGROUND ART

Distribution of full motion video data has evolved from early television broadcasting to meet viewer demand. Recently, several different wideband digital distribution networks have been proposed for offering subscribers an array of video services, including true Video On Demand service. The following U.S. Patents disclose representative examples of such digital video distributions networks: 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. For example, Litteral et al. U.S. Pat. No. 5,247,347 discloses a digital video distribution network providing subscribers with access to multiple Video On Demand service providers through the public switched telephone network.

The prior art video networks have not addressed many problems which arise when the networks must be adapted to provide end users with equal access to multiple video information providers. The networks of the prior art also typically have not been designed to accommodate a full range of digital services such as telephone, video, video-on-demand, data services, information services, interactive services, and other modern digital offerings.

A disadvantage of systems such as that of Litteral et al., which use the PSTN as a video distribution system is that they are often bandwidth limited. Because the systems use the PSTN only for connectivity between subscribers and/or between subscribers and Video Information Providers (VIPs), there is no capability for dynamic routing of digitized video without requiring dedicated leased, wide bandwidth circuits. Also, point-to-point connectivity makes it difficult to offer a wide array of broadcast services such as are now widely available through existing CATV systems.

Attempts have been made to improve the core switching, multiplexing and transmission technologies for integrated digital networks to support voice, data and video services from VIPs for multiple users. For example, fiber optic transmission systems with bandwidths ranging from 155.52 to 2,488.32 Mbps have been considered to improve bandwidth access. In addition, asynchronous transfer mode (ATM) has been developed as a technique to provide broad-bandwidth, low delay, packet-like switching and multiplexing. In ATM, usable capacity can be assigned dynamically (on demand) by allocating bandwidth capacity to supply fixed-sized information-bearing units called "cells" to point-to-point or multi-point outputs. Each cell contains header and information fields. The ATM standard, CCITT.121/2 specifies a 53 byte cell which includes a 5 byte header and a 48 byte payload.

MPEG (motion picture experts group) is a broad generic standard for digital video program compression. A number of specific compression algorithms satisfy MPEG requirements. MPEG-2 is a second generation compression standard capable of encoding video program material into a 6 Mbits/sec bit stream and packetizing a number of 6 Mbits/sec channel streams into a single higher rate signal transport stream. The conversion of MPEG-2 data into ATM cell format, however, imposes additional overhead requirements that reduce the information-carrying capacity of the network. For example, synchronous transmission protocols, such as SONET, may require a stream of continuous data to retain synchronization. Thus, an ATM data stream carrying MPEG video data that is transmitted on a synchronous carrier may need to be padded with ATM idle cells, or "dummy cells", in order to ensure proper synchronization with the physical layer. Therefore, the network's information-carrying efficiency is reduced each time information data is converted to another layer of transport protocol.

In addition, there has been a growth of VIPs offering video services to subscribers. The growth in the number of VIPs offering services will result in capacity problems on the PSTN connecting the VIP services to their subscribers. In addition, any one VIP may not fully utilize the physical connection to the PSTN when providing video services. Thus, if a plurality of VIPs each use an assigned optical fiber at, for example, fifty percent capacity, the PSTN will be inefficiently utilized if the optical fiber of each VIP is connected to the PSTN internal switches. Thus, a need exists for increased bandwidth and efficient connectivity techniques in the PSTN as competition increases between VIPs for connectivity to subscribers.

An example of a video network utilizing a Level 1 Gateway is disclosed in commonly-assigned copending application Ser. No. 08/304,174, filed Sep. 12, 1994 (attorney docket No. 680-093), the disclosure of which is incorporated herein in its entirety by reference. FIG. 1 corresponds to FIG. 4 of this commonly-assigned copending application and discloses a hybrid fiber-coax system which provides RF transport of both analog and digital broadband services. The illustrated network provides broadcast video distribution, archival video services and interactive multimedia services as well as plain old telephone service.

The network of FIG. 1 includes a Loop Transport Interface 10 located in a telco central office. In an area serviced through multiple central offices, several different central offices would each have a Loop Transport Interface similar in structure to the Interface 10 depicted in FIG. 1. In some respects, each Loop Transport Interface serves as the head-end of an otherwise conventional optical fiber trunk and coaxial cable type CATV distribution network.

In the Loop Transport Interface 10, a laser type optical transmitter 12 transmits downstream signals through fibers 14 to optical to electrical nodes referred to as "optical network units" or ONU's. The laser operates in a linear mode in the range of 5–750 MHz. The transmitter 12 is followed by an optical splitter that can transmit to several ONU nodes 16. Each ONU 16 performs optical to electrical conversion on the downstream signals and supplies downstream RF electrical signals to a coaxial cable distribution system 18.

The optical transmitter receives and transmits signals from an RF (radio frequency) combiner 20. The combiner 20 combines levelized RF signals from several sources to produce the appropriate signal spectrum for driving the optical transmitter 12. One set of signals supplied to the RF combiner 20 are group of AM—VSB (amplitude modulated vestigial sideband) analog television signals 22 from one or more appropriate sources (not shown). Such signals are essentially "in-the-clear" CATV type broadcast signals capable of reception by any subscriber's cable ready television set.

The analog television signals are broadcast from the optical transmitter 12 through the tree and branch optical and coax distribution network to provide "basic" CATV type service to all subscribers on the network. In order to obtain additional network services as discussed below, the subscriber may obtain a digital entertainment (DET) 24. A network interface module in the DET 24 includes a tuner that permits subscribers to the digital services to receive the analog broadcast channels through the same equipment used for the digital services.

The network depicted in FIG. 1 also provides transport for digitized and compressed audio/video programming, both for certain broadcast services and for interactive services, such as video on demand. The network uses a video compression called Motion Picture Experts Group (MPEG). The MPEG encoded video is transported to each Loop Transport Interface using asynchronous transfer mode (ATM) transport and switching.

In the illustrated network, digital broadcast service signals 26 in MPEG encoded form and arranged in ATM cell packets are applied to an ATM packet handler 28 in the Loop Transport Interface 10. These broadcast service signals 26 originate in one or more broadcast VIP's ATM encoders, controlled by the VIP's servers. The ATM broadcast services carry premium service type programming. For certain interactive services which utilize one digitized channel to provide limited downstream transport to a large number of subscribers, the ATM broadcast cell stream signals originate from a server 30. Fully interactive broadband digital signals, in MPEG—ATM format, are also applied to the ATM packet handler 28 from an ATM switch 32. The ATM packet handler 28 terminates all ATM cell transport through the network, and converts the cell payload information into MPEG-2 format bit streams.

In addition to the analog broadcast signals, the RF combiner 20 receives a variety of other analog RF signals from a group of RF digital modulators 34 that output the MPEG streams from the ATM packet handler 28 as digital broadband information in RF analog format. Each RF modulator 34 outputs a 6 MHz bandwidth IF signal which an upconverter (not shown) tunes to a different RF channel having a corresponding carrier frequency. A network controller 36 and an associated network data processor (NDP) 38 use the VPI/VCI header from the ATM cells to control the ATM packet handler 28 to route the MPEG bit streams to the appropriate digital RF modulator 34.

The RF modulators 34 use 64 QAM (quadrature amplitude modulation) or 16 VSB (vestigial sideband) modulation techniques. The 64 QAM is used to modulate 4 channels of 6 Mbits/s MPEG encoded digital video information into one 6 MHz bandwidth analog channel. Similarly, 16 VSB modulates 6 channels of 6 Mbits/s MPEG encoded digital video information into one 6 MHz bandwidth analog channel. As another example, U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six MHz channel allocation for transmission over a CATV type distribution network.

The 6 MHz bandwidth RF signals from the modulators 34 are supplied to the optical transmitter 12 for downstream transmission together in a combined spectrum with the AM—VSB analog television signals 22. The downstream transport of the digital programming is an RF transmission essentially the same as for the analog basic service channels, but each of the channels from the RF modulators 34 contains 4 or 6 digitized and compressed video program channels, referred to hereinafter as "slots". The 6 Mhz digital program channels are carried through the fiber and coaxial system in standard CATV channels not used by the analog basic service programming. The ONU 16 is essentially transparent to both the analog basic service channels and the channels carrying the digital programming and supplies all of the signals as a combined broadcast over the coaxial cable network 18.

At the subscriber premises, a network interface module (NIM) (not shown) couples the set-top device or digital entertainment terminal (DET) 24 to a drop cable of the coaxial distribution network 18. In this network configuration, the NIM includes an analog frequency tuner controlled by a microprocessor to selectively receive the RF channel signals, including those channels carrying digital information. The NIM also includes a QPSK, QAM or VSB demodulator to demodulate a selected one of the digitized program signals carried in one of the digital slots within a received 6 MHz channel and performs a forward error correction function on the demodulated data. A digital audio/video signal processor within the DET decompresses received video signals, generates graphics display information and performs digital to analog conversion to produce output signals compatible with a conventional television set 40.

The analog tuner in the NIM tunes in all channel frequencies carried by the network, including those used for the analog broadcast services. The DET 24 includes a bypass switch and an analog demodulator to selectively supply analog signals from the basic service channels directly to the audio/video output terminals or to the modulator, to provide signals to drive a standard television receiver.

The DET 24 also includes a remote control and/or keypad to receive various selection signals from a user. The DET relays data signals upstream over a QPSK signaling channel on the coaxial cable to the ONU 16 in response to user inputs such as selection of a pay per view event. The actual transmission of any such data signals upstream from the DET 24 occurs in response to a polling of the DET. The ONU 16 combines upstream data signals from the DET's serviced thereby and transmits those signals upstream over another optical fiber 42 to an optical receiver 44 in the Loop Transport Interface 10. Each DET 24 may transmit data on a different carrier frequency, in which case the network controller 36 knows during the polling process which DET sent particular data based on the received frequency channel. Alternatively, for interactive services, the DET may transmit a unique identification code with the upstream message.

In the implementation of the network illustrated in FIG. 1, an ACC 4000D 46 performs set top management and specific program access control functions. In particular, service profiles for each customer on the network and their DET's are set up and stored within the Level 1 Gateway 48. The Level 1 Gateway 48 may also provide an interface to appropriate billing systems (not shown) for some broadcast services, such as pay per view.

For ATM broadcast services, when a subscriber first signs up, a portfolio of channels subscribed to by that customer is established in the subscriber's profile data within the ACC 4000D 46. Based on this profile data, the ACC 4000D 46 downloads a service map into the subscriber's DET 24. The downstream transmission portion of the network provides an out-of-band downstream signalling channel to the DET's, for example for the downloading of the service map information from the ACC 4000D 46 to each DET 24. This downstream signaling channel also carries signals for controlling software downloading and/or selection of certain channels or frames for decoding in interactive services.

All digital broadcast service signals are broadcast into each subscriber's premises, and each DET 24 includes means for receiving and decoding each such digital broadcast service channel, which may include premium channels. The microprocessor in the DET 24 controls access to any of these channels based on the downloaded map information stored in the system memory. For example, if one subscriber requests HBO, and that subscriber has paid to subscribe to HBO, the subscriber's DET 24 contains map information instructing it to tune to the RF channel and select and decode the digital program slot carrying HBO for display on the subscriber's television set 40. However, if a requesting subscriber has not paid for HBO, the downloaded service map will not provide the requisite data for tuning and decoding of that channel. If a decryption key is needed, the Level 1 Gateway 48 instructs the video manager 50 to instruct the ACC 4000D 46 to transmit the key to subscriber's DET 24.

The implementation of the network illustrated in FIG. 1 also provides telephone service. Between the optical network unit and the subscriber premises, the 700–750 MHz portion of the spectrum on the coaxial cable carries the telephone signals. This allocated spectrum provides transport for 24 DS0 telephone channels. Each subscriber premises has telephone interface referred to as a Cable Network Unit (CNU) 52 coupled to the coaxial cable which serves to couple two-way signals between a twisted wire pair into the home and the telephone frequency channels on the coaxial cable 18. Upstream telephone signals are applied from the optical receiver 44 to a host digital terminal (HDT) 54 which provides an interface to a standard digital telephone switch 56. Downstream telephone signals from the switch 56 pass through the HDT 54 to the RF combiner 20 for transmission in the 700–750 MHz frequency range over the fiber to the ONU 16 and the coaxial cable distribution system 18. Upstream telephone signals are output in the 5–40 MHz frequency range of the coaxial cable, which are block converted in the fiber nodes for transport on an optical fiber.

The implementation of the network illustrated in FIG. 1 also offers access to video information providers (VIP's) for interactive broadband services, such as video on demand. For archival services and many other interactive services, each VIP has a level 2 gateway and some form of broadband information file server 403. The ATM switch 32 provides communications links between the Loop Transport Interfaces 10 and the level 2 gateways and file servers 60. Customer access to the VIP's is controlled through one or possibly more programmed computer or processor elements performing the processing functions of the Level 1 Gateway 48. A permanent virtual circuit (PVC) controller 56 and a video manager 50 respond to signals from the Level 1 Gateway to control the point to point routing through the network.

The PVC controller 56 stores data tables defining all possible virtual circuits through the ATM switch 32 and the Loop Transport Interface 10 serving each DET terminal of a customer subscribing to each particular provider's services. These data tables define the header information and the switch port to the packet handlers needed to route cells to the correct Loop Transport Interface. The video manager 50 stores similar data tables identifying the transmission fiber ports, RF channels and multiplexed digital channel slots which may be used to transport each data stream processed by the ATM packet handler 28 through the fiber 14 to the appropriate ONU 16 serving each DET. The data tables in the PVC controller 56 and the video manager 50 thus define "permanent virtual circuits" between the VIP's equipment 403 and the DET's 24.

For a full, broadband interactive session, the subscriber operates the DET 24 to interact with the Level 1 Gateway 48 and select a VIP. The PVC controller 56 responds to instructions from the Level 1 Gateway by activating the ATM switch 32 to establish a downstream virtual circuit path between a port of the VIP's server and the ATM packet handler within the Loop Transport Interface 10 servicing a subscriber requesting a call connection to the particular VIP. The video manager 50 assigns a particular one of the digitized video channel slots in a digital program type RF channel to carry the particular point to point communication. Specifically, the video manager controls the ATM packet handler 28 to route MPEG data recovered from the ATM cells for the particular point to point communication to the port for one of the RF modulators 34 so that the modulator will include the MPEG data in the assigned digital channel slot within a particular 6 MHz RF channel. The video manager 50 also transmits a signal downstream through the signaling channel to the subscriber's DET 24 instructing the DET to tune to the particular RF channel and decode MPEG data from the specifically assigned digital channel within that RF channel. Similar dynamic assignments of RF channels on a CATV system to individual terminals for interactive services are disclosed in U.S. Pat. No. 5,220,420 to Hoarty et al. and U.S. Pat. No. 5,136,411 to Paik et al., the disclosures of which are incorporated herein in the entirety by reference.

Concurrently, the Level 1 Gateway 48 would instruct the PVC controller 56 to control the ATM switch 32 to establish an upstream virtual circuit for control signals sent from the DET 24 up through the fiber-coax network and receiver 44 to the VIP's level 2, gateway.

While the network disclosed in FIG. 1 is able to provide broadcast video and interactive video services to video subscribers, the overall architecture is limited in that the loop transport interface 10 is able to service only a limited number of living units, for example approximately 2,000. Thus, if it is desired that full-service digital broadband video services are to be provided to a greater population, a substantial expenditure must be invested to install additional loop transport interfaces throughout proposed video service areas. Since the costs for installing and implementing the additional loop transport interfaces 10 may be substantial, a network provider may be hesitant to invest substantial capital for new equipment necessary for the additional loop transport interfaces if the new subscribers in the proposed video service areas are willing to pay only a limited amount of subscriber fees.

In addition, the network disclosed in FIG. 1 requires a substantial amount of control processing and connectivity with the video information providers and the corresponding servers 60. If additional loop transport interfaces 10 are to be added to proposed service areas, the VIPs may be required to communicate with multiple level 1 gateway controllers 48 from the different service areas, creating additional difficulties in management and service processing for the VIPs.

DISCLOSURE OF THE INVENTION

A principal object of the present invention is to provide a seamless, smooth approach for connecting a video information user (VIU) to the video information provider (VIP) of their choice, in a multiple provider environment. The connection to the VIP of choice must be provided in a non-discriminatory manner that enables the user to easily access that particular provider. The network must have the capability to selectively connect the VIU to broadcast services and to IMTV services.

Another objective is to provide an improved distributed network architecture that distributes video services over a greater serving area, while at the same time maintaining flexibility for VIPs to provide IMTV and point-to-point video services and that maximizes use of shared network resources.

The present invention provides a video distribution network having an architecture that is designed for flexible implementation, expandability, and efficient resource management to optimize economies of scale. Although the disclosed network can be implemented in a small-scale service area, the expandability and distributed architecture of the network enables signal processing costs to be distributed over a larger serving area, thereby enabling network providers to provide video services at lower costs to subscribers.

The present invention also provides centralized control of network services and interfaces between video information providers (VIPs) and video information users (VIUs), while at the same time providing flexible signaling and transport of control signals and video data. The VIPs are able to communicate with the centralized control of the network for VIU account mangement, event scheduling, and for traffic management (bandwidth assignments, data transport paths, etc.). The network manages both broadcast (point-to-multipoint) and interactive (point-to-point) sessions with minimal overhead required by the VIP.

The present invention also is adapted to transport broadband data to and from the VIP to a VIU, independent of the data format or the hardware of the network users. The term "network users" generally refers to both VIPs and VIUs. Thus, the network of the present invention is designed to accomodate different access technologies and hardware specifications that may be used by the video information providers, as well as the video information users. In addition, the network is adapted to transport broadband data that may be types other than video; thus, the network is adapted to transport any type of data that satisfies the interface requirements of the network, thereby enabling transport of interactive multimedia services from sources such as, for example, Internet. As such, the network of the present invention provides network interfaces designed to serve as generic interfaces, thereby providing maximum flexibility for the network users.

The network of the present invention has a distributed architecture to service a number of local serving areas with a minimum of hardware or signal processing. According to a preferred embodiment of the present invention, the network includes a broadcast consolidation section, a broadcast fiber optic ring, a plurality of video network hubs, a plurality of video end offices, and an ATM backbone subnetwork. These components of the network provide an architecture that provides both distributed services and flexibility for providing service as well as expandability.

The network broadcast consolidation section serves as a network interface for broadcast video information providers. The network interface is adapted to accept baseband analog video as well as digital video. The broadcast consolidation section combines the broadcast data from the VIPs and outputs the consolidated broadcast data on a unidirectional fiber optic broadcast ring. The broadcast ring supplies the consolidated broadcast data to a plurality of video network hubs (VNH) coupled to the broadcast ring, also referred to as video access nodes.

Each of the video network hubs serviced by the broadcast ring downloads the consolidated broadcast data from the broadcast ring, converts the consolidated broadcast data to MPEG data on an RF carrier, and combines the RF signal with other RF signals (such as over-the-air broadcast signals or public access channel TV) before transmission by optical fiber. Each video network hub outputs the combined RF signals to a corresponding plurality of video end offices, also referred to as local video access nodes (LVAN). The video end offices receive the combined RF signals from the corresponding video network hub, combine the received RF signals with point-to-point downstream traffic from the ATM backbone subnetwork, and output the combined RF signals to the access subnetworks servicing the subscribers, such as a hybrid-fiber-coax loop distribution system.

The network includes an ATM backbone subnetwork designed to provide transport for all control and signaling traffic throughout the network, as well as transport for any data for point-to-point communications from an appropriate source to the video end office serving a subscriber requesting a session with the particular source. Thus, not only does the ATM backbone subnetwork provide signaling information between the Level 1 gateway, the network control center and the corresponding video network hubs and video end offices, but it also provides the point of interconnection for VIPs for IMTV sessions with VIUs.

Thus, the present invention provides a broadband data network that provides centralized control and signal processing with distributed data transport to provide broadband data services to a greater number of subscribers at a greater level of efficiency for both VIPs and VIUs.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
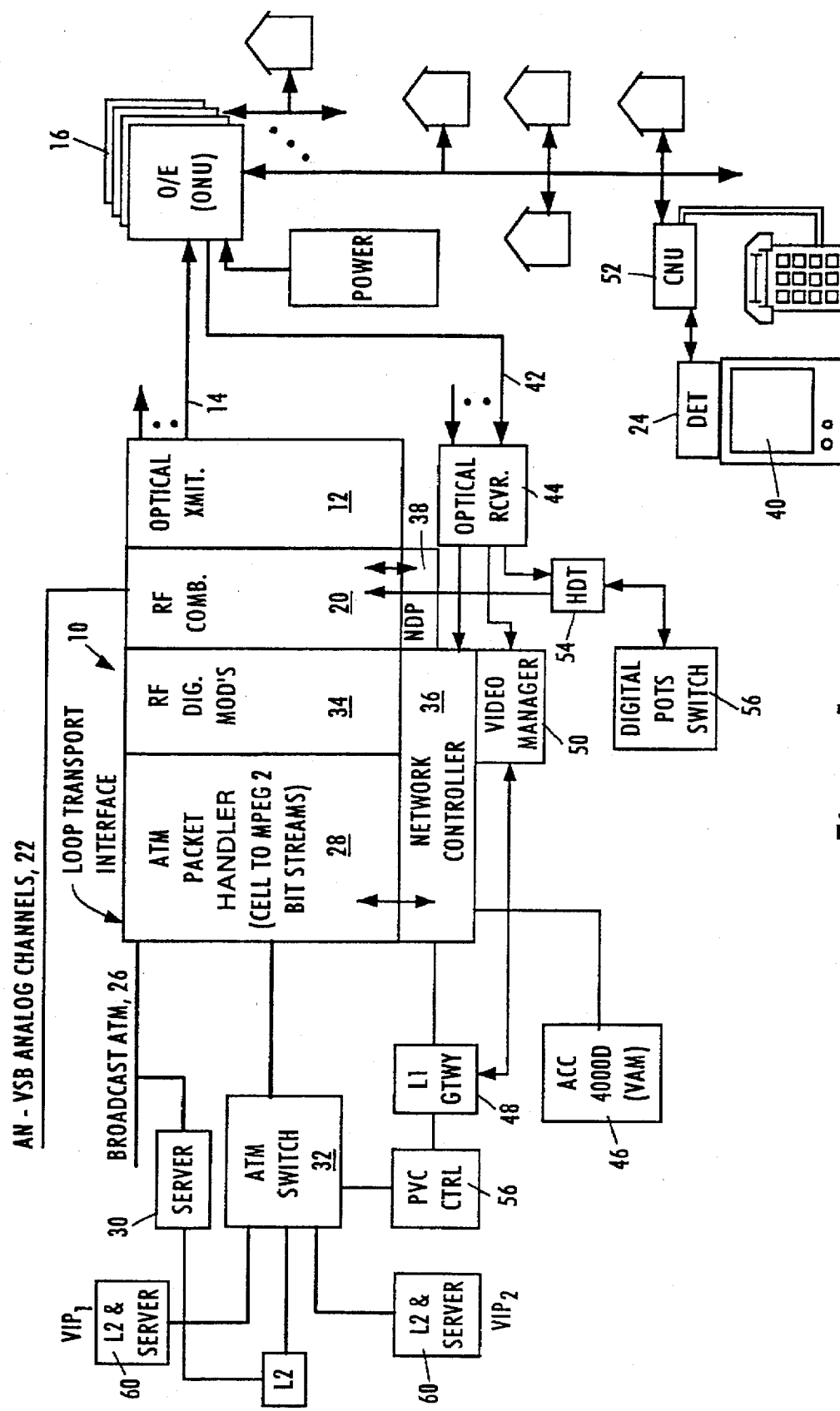
FIG. 1 is a block diagram of a proposed architecture for a video dial tone network.

Reference is made to the attached drawings, whereby elements having the same reference numeral designations represent like elements throughout.

Figure 2:
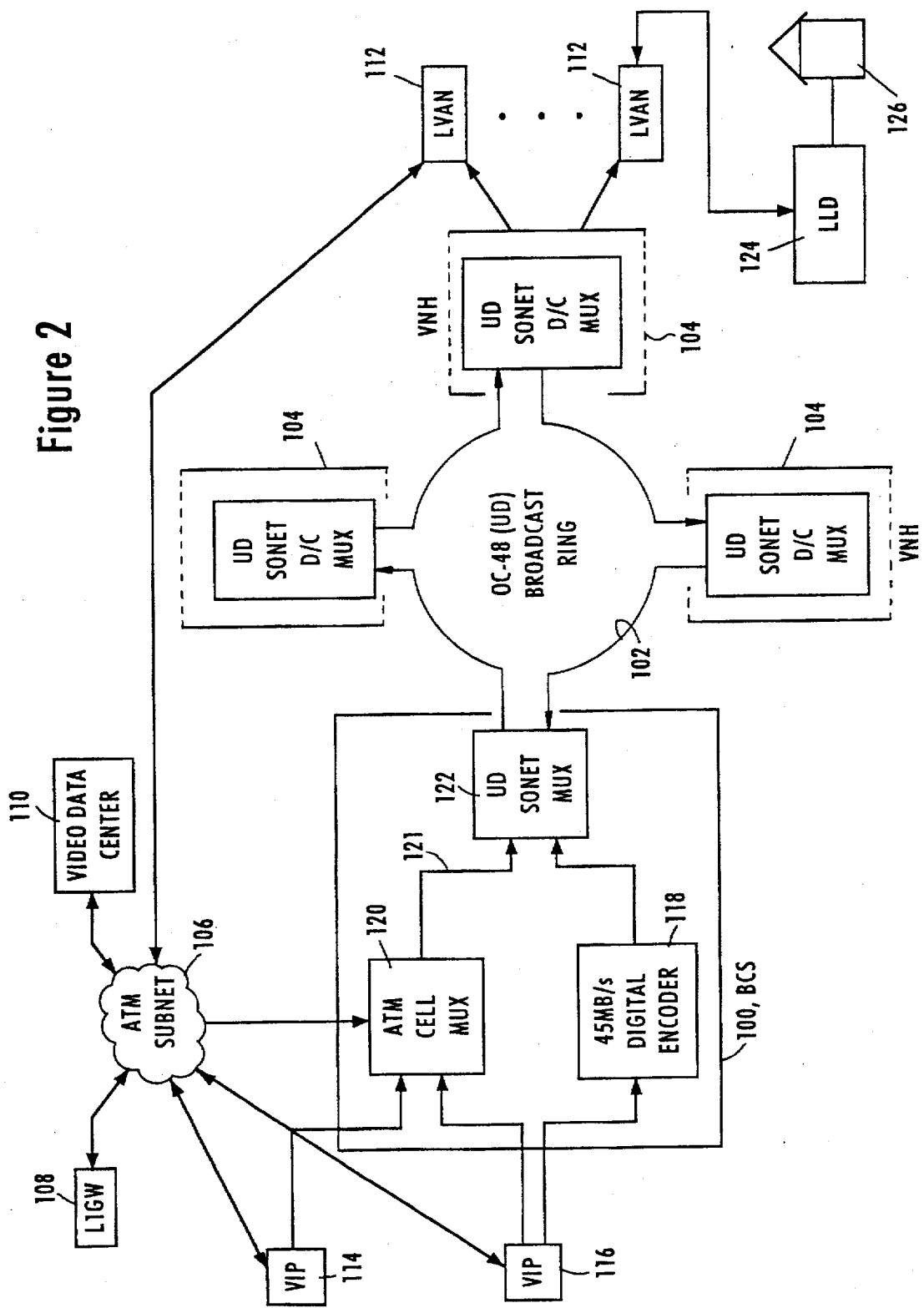
FIG. 2 is a block diagram of a distributed network architecture for a broadband data full service network according to a preferred embodiment of the present invention.

FIG. 2 discloses a distributed network architecture for a broadband data full service network according to a preferred embodiment of the present invention. The disclosed network is arranged to centralize signal processing tasks within a LATA in order to minimize hardware. At the same time, the disclosed network provides maximum flexibility by providing communications to local access nodes, each serving a local loop of subscribers.

The network disclosed in FIG. 2 includes a broadcast consolidation section (BCS) 100, a broadcast ring 102, a plurality of video network hubs (VNH) or video access nodes 104 coupled to the broadcast ring 102, an ATM backbone subnetwork 106, a level 1 gateway 108, a video data control center 110, and a plurality of video end offices or local video access nodes (LVANs) 112. According to the preferred embodiment, each of the the video network hubs 104 will serve a corresponding plurality of up to six (6) LVANs 112. In addition, the preferred embodiment will provide up to sixteen (16) VNH's 104 serviced by the ring 102.

The broadcast consolidation section 100 serves as the broadcast head-end and network interface (NI) for broadcast VIPs 114 and 116. The broadcast consolidation section 100 is adapted to receive broadcast video data in any format that may be convenient for the VIP. Specifically, the broadcast consolidation section 100 includes a digital encoder 118 to convert baseband analog video signals, for example from VIP 116, into a digitally-compressed DS-3 signal stream. Alternatively, the digital encoder 118 could be replaced with an MPEG-2 encoder to provide compressed MPEG-2 packets at a DS-3 rate.

The broadcast consolidation section 100 also includes an ATM cell multiplexer 120, also referred to as an ATM edge device, which performs policing and rate conversion of incoming ATM streams. The ATM edge device 120 performs policing of ATM cell streams by monitoring the data rate of incoming data streams from VIPs. For example, if the VIP 114 has subscribed by contract to transmit a data stream at 3 Mbit/s to the network, the ATM edge device 120 will prohibit or drop ATM cells that are transmitted above the subscribed bit rate; in this case, a 6 Mbit/s stream would be rejected as an unauthorized rate.

In order to maximize the data-carrying capacity of the ATM streams supplied to the ATM edge multiplexer 120, the VIP 114 and the VIP 116 will preferably supply digital video signals in compressed MPEG-2 format that are transported in ATM cells.

The MPEG-2 standard, recognized in the art, provides a standardized format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or a program stream for storage.

Each frame of compressed program information (audio, video or data) is broken down into a series of transport packets. Although video frames can vary in length, the transport packets have a fixed 188 byte size. Thus, different frames are broken down into different numbers of MPEG-2 transport packets. For example, for a 6 Mbits/sec encoding system, a group of frames consisting of a total of 15 frames for one-half second of video breaks down into approximately 4000 transport packets.

Transport stream packets consist of a 4 byte header section, an optional adaptation field and a payload section. The header information includes, inter alia, a synchronization byte, a variety of different flags used in reconstruction of the video frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program clock reference (PCR) value within the optional adaptation field. For example, the PCR may be present in only 10 out of every 4000 video transport packets.

MPEG-encoded packets can be output in a variety of data rates. For example, the MPEG-2 compression standard is able to encode a video program to a 6 Mbits/sec bit stream, and packetize up to four (4) 6 Mbits/sec bit streams into a single 27 Mbits/sec stream. For other lower-rate data streams carrying text or signaling information, up to eight (9) 3 Mbits/sec bit streams can be packetized into a single 27 Mbits/sec stream, and up to sixteen (18) 1.5 Mbits/sec bit streams can be packetized into a single 27 Mbits/sec stream. In addition, different combinations of MPEG data streams may be used to fully utilize the 27 MB/s stream, for example four (4) 6 MB/s streams and one (1) 3 Mb/s stream, or four (4) 6 Mb/s streams and two (2) 1.5 MB/s streams.

Alternatively, six (6) analog audio-video program signals can be processed in parallel to provide six (6) 6.312 Mbits/sec MPEG-2 packets that can be output on a single 45.736 Mbits/sec DS-3 bit stream. In addition, a synchronous optical fiber such as SONET at 155 Mbits/sec (OC-3) can carry twenty (20) 6 Mbits/sec MPEG streams.

Thus, each of the VIPs 114 and 116 are preferably able to compress up to six (6) NTSC analog audio/video program signals in parallel into an MPEG-2 format. The resulting six (6) MPEG-2 packet streams are converted into an ATM stream before transport to the ATM edge multiplexer 120. The ATM streams may be output at a 45 Mbits/sec (DS-3) rate for carrying up to six (6) MPEG-encoded programs, or on an optical fiber at 155 Mbits/sec (OC-3) for carrying up to twenty (20) MPEG-encoded programs.

Asynchronous transfer mode or "ATM" transport is an advanced, high-speed packet switching technology. In ATM, information is organized into cells having a fixed length and format. Each cell includes a header, primarily for identifying cells relating to the same virtual connection, and an information field or "payload". According to the preferred embodiment, a 53 byte ATM cell includes a cell header consisting of 5 bytes and a payload consisting of 48 bytes of payload data. The ATM cell header information includes a virtual path identifier/virtual channel identifier (VPI/VCI) to identify the particular communication each cell relates to. For example, the virtual path identifier (VPI) may be used to identify a specific VIP 114 or 116, and the virtual channel identifier (VCI) may be used to identify a specific output port of that VIP. In such a case, for example, VIP 114 could be assigned a VPI value of "65", and VIP 116 could be assigned a VPI value of "66". Thus, the VPI/VCI value of the ATM cell header could be used to identify the source of the ATM stream.

In ATM, transfer is asynchronous in the sense that the recurrence of cells that contain information from any particular sender is not necessarily periodic. Each device using the ATM network submits a cell for transfer when they have a cell to send, not when they have an assigned or available transmission time slot. However, the ATM cells may ride in the payload of a high-speed time division multiplexed media, such as a SONET optical fiber. ATM allows any arbitrary information transfer rate up to the maximum supported by the network, simply by transmitting cells more often as more bandwidth is needed.

During the ATM conversion process, the individual programs from the MPEG packets are broken into cell payloads and VPI/VCI header information is added to map the programs into ATM virtual circuits in the corresponding output cell stream. As noted above, each MPEG packet consists of 188 bytes, whereas each ATM cell includes 48 bytes of payload data. The preferred mapping scheme uses two different adaptations. The first adaptation maps one 188 byte MPEG packet into five ATM 48 byte cell payloads. The second adaptation maps two 188 byte MPEG packets into eight ATM 48 byte cells payloads.

MPEG packets of 188 bytes map efficiently into ATM cells if pairs of packets are mapped into 8 cells. However, a delay is imposed on mapping of a first cell while waiting for the second cell in the pair. To minimize jitter during decoding, the packets carrying the PCR need to be encoded and transported quickly. To avoid delaying first packets containing a PCR while processing a second packet, the ATM multiplexer 215 maps first packets containing a PCR immediately, using the five cell adaptation procedure. As noted above, the PCR is typically present in only 10 out of every 4000 packets. Also, at least some of those 10 packets likely will arrive as the second packet of a pair. Consequently, only a very small number of packets are mapped using the less efficient 5-cell adaptation.

As noted above, each cell of a particular stream will have a header which contains a virtual path identifier/virtual channel identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/VCI.

As noted above, the VIP 114 and/or VIP 116 may transmit the ATM cells on a SONET optical fiber at an OC-3 rate, or may transmit the ATM cells at a DS-3 rate. The transmission of ATM cells in an asynchronous DS-3 signal may require a common clock reference in order to ensure frame alignment. In a particular aspect of the present invention, the network interface 100 receives the DS-3 signal carrying six MPEG-2 channels in ATM cell format from the ATM VIPs in accordance with a physical layer convergence protocol (PLCP). The PLCP is a framing structure used to ensure that ATM cells are aligned with respect to a corresponding video frame, even though there may exist drifting of a start and end of a typical DS-3 frame. Specifically, the PLCP references a DS-3 header and identifies the location of each ATM cell with respect to the DS-3 header. Since the DS-3 frame contains a maximum of twelve ATM cells, the PLCP notes the location of each of the cells 1–12 with respect to the DS-3 header. Therefore, even though there may be DS-3 frame drifting, the PLCP ensures alignment, from a cell perspective, between the cell layer and the DS-3 frame so that each of the twelve ATM cells within each DS-3 frame can be located.

The ATM edge multiplexer 120 acts as a groomer for multiple VIP terminations to prevent extraneous data from using network resources. The ATM streams from the VIPs 114 and 116 may arrive in either DS-3 format or via optical fiber in OC-3 format. The ATM edge device 226 provides a grooming function, whereby ATM cells are analyzed, on a cell-by-cell basis, to determine if they should be transmitted on the network. Specifically, ATM cell headers that do not have valid data are dropped from the ATM stream. Each valid ATM cell is mapped on the basis of its corresponding VPI/VCI header to a valid OC-3 output port of the ATM edge device 120. In addition, the ATM edge device 120 maps the ATM idle bits containing no information that are present in the ATM stream from the VIPs to a null port, thereby rejecting the received ATM idle bits. This ATM cell mapping, also referred to as cell translation, enables DS-3 ATM cell streams that are transmitted at less-than-full capacity to be mapped onto at least one OC-3c stream operating at full capacity. This is particularly effective when, for example, optical fibers used by the VIPs 114 or 116 to transport DS-3 ATM streams using optical fibers will not be operated at capacity, especially when VIPs using the optical fibers have varying bandwidth requirements over time. For example, a VIP providing business news may require more bandwidth for daytime news programming, whereas a VIP providing entertainment programming may require more bandwidth during evenings and weekends. The ATM edge processor 120 processes all incoming DS-3 bit streams received thereby, and maps the DS-3 bit streams into at least one condensed, or combined bit stream for transmission through the network. Specifically, the incoming DS-3 and OC-3 streams are supplied to corresponding first-in-first-out (FIFO) input buffers internal to the 120 to supply the ATM cells to an internal multiplexer on a cell-by-cell basis; the internal multiplexer outputs the translated cells preferably to OC-3 output buffers for synchronous transmission on optical fibers 121. Since the ATM cells are output at a rate of 155 MHz (OC-3), each of the optical fibers 121 carry up to twenty (20) MPEG programs at 6 Mbits/sec. Thus, the ATM edge processor is able to fully load the downstream optical fibers 121 thereby to fully load the capacity of the network. A more detailed description of the ATM cell multiplexer 120 is found in copending and commonly-assigned application Ser. No. 08/380,744, filed Jan. 31, 1995 (attorney docket No. 680-109), the disclosure of which is incorporated in its entirety by reference.

According to the preferred embodiment, the digital encoder 118 outputs a digitally encoded data stream in DS-3 format (45 MB/s), and the ATM edge multiplexer 120 outputs an ATM stream in OC-3c format (155.5 MB/s), to a SONET multiplexer 122. The SONET multiplexer 122 multiplexes the DS-3 and OC-3 signals from the digital encoder 118 and the ATM edge multiplexer 120 and outputs the consolidated broadcast data onto the unidirectional optical fiber broadcast ring 102 operating at an OC-48 format (2488.3 MB/s). In other words, the SONET multiplexer 122 may receive a plurality of OC-3 optical fibers 121, either from the ATM edge multiplexer 120 or a plurality of such multiplexers; in addition, the SONET multiplexer 121 may receive a plurality of DS-3 signals from a corresponding plurality of encoders such as digital encoder 118. The SONET multiplexer 122 buffers the OC-3 and DS-3 input signals and multiplexes the input signals together at a rate of 2488.3 Mbits/sec. An exemplary SONET multiplexer is the FT-2000, manufactured by AT&T.

The broadcast ring 102 is arranged as a drop-and-continue (D/C) SONET transport to service up to fifteen (15) VNH's 104. Additional VNH's may be serviced by overcoming the distance limitations of the optical fibers. Although the broadcast ring 102 preferably has one OC-48 fiber, the broadcast ring 102 may be be modified to include 2 or more OC-48 fibers for additional traffic, or for bidirectional traffic around the ring. As discussed below in detail with respect to FIG. 3, each VNH 104 receives the broadcast ATM streams from the broadcast ring 102, converts the ATM streams to MPEG-2 streams that are transmitted on an RF carrier, and adds local broadcast information (e.g., over-the-air access, public access channel) before transport to the LVAN 112 as RF signals, preferably by optical fibers.

Each LVAN 112 receives the consolidated broadcast data from the corresponding VNH 104. The LVAN 112 combines the received RF signals from the VNH 104 with any data transmitted by the ATM backbone subnetwork 106 addressed to a subscriber served by the LVAN 112. The resulting RF signal is transmitted via a local loop distribution network 124 to a customer premises 126. As discussed below with reference to FIG. 5, the local loop distribution 124 is preferably arranged as a hybrid fiber-coax distribution system, although an ADSL system or a fiber-to-the-curb system may be substituted. In addition, the equipment at the subscriber site includes a network interface device (NID) for splitting the RF signal, a network interface module (NIM) for decoding encrypted data from the network and routing MPEG data streams, and a digital entertainment terminal (DET) for decoding the MPEG data streams passed by the NIM. Additional details regarding the NIM and the DET are discussed below with reference to FIG. 5.

As shown in FIG. 2, each LVAN 112 has access to the ATM backbone subnetwork 106 in order to send and receive network signaling information to and from the level 1 gateway 108 and/or the video data control center 110. For example, a video information user (VIU) who wishes service on the network via one of the LVAN's 112 may request the service either by calling a network business office by telephone or by requesting a level 1 gateway session from his or her customer premises 126 in order to perform online registration. As discussed in detail below, the ATM backbone subnetwork 106 provides signaling information between the LVAN 112 serving the VIU, the level 1 gateway 108 and the video data control center 110 in order to activate the VIU on the network, or to update the services available to the VIU.

The ATM backbone subnetwork 106 also is adapted to communicate with the VIPs 114 and 116 in order to perform account management between the VIPs, the level 1 gateway 108 and the video data control center 110. For example, the VIP 114 may supply a request to the level 1 gateway 108 for a desired bandwidth in order to broadcast a pay-per-view event at a predetermined time. The level 1 gateway 108 and the VIP 114 will determine the appropriate VPI/VCI header to be loaded onto the ATM stream to be supplied to the ATM edge multiplexer 120 of the broadcast consolidation section 100. The level 1 gateway 108 will inform the video data control center 110 of the scheduled event, as well as the VPI/VCI of the video data stream. The level 1 gateway 108 will also communicate with the VIPs 114 and/or 116 via the ATM backbone subnetwork 106 in order to maintain up-to-date lists of authorized VIUs to receive the selected VIP services.

Finally, as discussed in detail below with respect to FIG. 6, the VIP 116 may conduct an interactive (IMTV) session with a VIU via the ATM backbone subnetwork 106 and the LVAN 112 servicing the specific VIU. Although not shown in FIG. 2, the VIP 116 can conduct IMTV sessions with a VIU using a level 2 gateway and an IMTV server internal to the VIP 116. The Level 2 gateway communicates with the level 1 gateway 108 of the network as well as the network's business service center, to receive and process requests for IMTV sessions that include routing information. The IMTV server outputs broadband data for the VIU as an ATM cell stream to the ATM backbone subnetwork 106.

Communication between the network and the VIP 116, as well as between the network and the VIU, is performed via the level 1 gateway 108. From the VIU perspective, a user will communicate with the network via the level 1 gateway 108 in order to select the VIP 116 for an IMTV session. In a network providing access to multiple IMTV service providers, the user wishing to establish an IMTV session identifies the provider of choice to the Level 1 Gateway 108 by inputting control signals to the user's DET, which supplies the appropriate signals upstream from the customer premises 126 to the level 1 gateway 108 via the corresponding LVAN 112 and the ATM backbone subnetwork 106. In response, the Level 1 Gateway 108 controls the broadband routing functionality of the network to establish a downstream broadband communication link and a two-way communication signaling link between the provider and the user.

The Level 1 Gateway 108 receives notification of the status of broadband communications links as they are being set up and during ongoing communications through those links. The Level 1 Gateway 108 therefore can inform a subscriber when a requested session can not be set up with a selected service provider, i.e. because the provider's server ports are all busy or because the subscriber is not registered with the particular provider or due to some technical problem. The Level 1 Gateway 108 also recognizes when an established link develops a fault or is interrupted and can stop accumulating usage or billing data regarding that link. The Level 1 Gateway 108 can also notify the subscriber and/or the service provider of the failure.

The Level 1 Gateway 108 will also store various information relating to each subscriber's services and control service through the network accordingly. At least some of this stored data is accessible to the subscriber through a direct interaction with the Level 1 Gateway 108. For example, the user can identify certain service providers to the Level 1 Gateway 108 and define an authorization code or identification number which must be input before the network should provide a session with the user's equipment 126 and the identified providers.

Many of the functions of the Level 1 Gateway 108 relate principally to set up, monitoring and billing for point-to-point type interactive sessions. As noted above, however, a number of the Gateway functions also apply to broadcast services. For example, the interaction with the Level 1 Gateway 108 can be used to advance order upcoming broadcast pay per view events. At the time for the event to begin, the Level 1 Gateway 108 will transmit appropriate notice to the ordering subscriber's terminal. In response, the terminal may display the notice to the subscriber or the terminal may automatically turn on and/or tune to the appropriate communication link through the broadcast network to obtain the ordered event. The interactive features of the Level 1 Gateway 108 also permit subscribers to specify limitations they wish to place on their broadcast services, e.g. total number of hours of usage within some defined interval and/or time of day/week of permitted usage. The Level 1 Gateway 108 will then control the broadcast network and/or the subscriber's terminal in accord with the limits defined by the subscriber.

In another aspect, the level 1 gateway 108 controls a broadband communication network. Specifically, the level 1 gateway 108 comprises a series of application modules. A service data module maintains service data files relating to information service providers offering services through the broadband communication network. This module also maintains data files regarding information users subscribing to service through the broadband communication network. A service control module interacts with users through terminals coupled to the broadband communication system. In response to selection information from the users terminals, the service control module uses the data files maintained by the service data module, to generate requests for broadband communication sessions between selected providers and selecting users terminals. A session management module is responsive to the requests for broadband communication sessions, for identifying end to end communication connectivity needed for each requested broadband communication session. The session management module generates requests for the identified end to end communication connectivity and collects usage information relating to established broadband communication sessions. A connection management module in turn is responsive to the instructions from the session management module. The connection management module identifies entry and exit points through subsections of the broadband communication network for the communication connectivity needed for each requested broadband session. This module also interacts with a control element of each subsection of the network to obtain communications connectivity through each subsection, to establish the end to end communication connectivity for each requested session. The connection management module also provides confirmation of establishment of each requested broadband communication session to the session management module.

These and other features of the level 1 gateway 108 are described in further detail in connection with FIG. 6.

Figure 3:
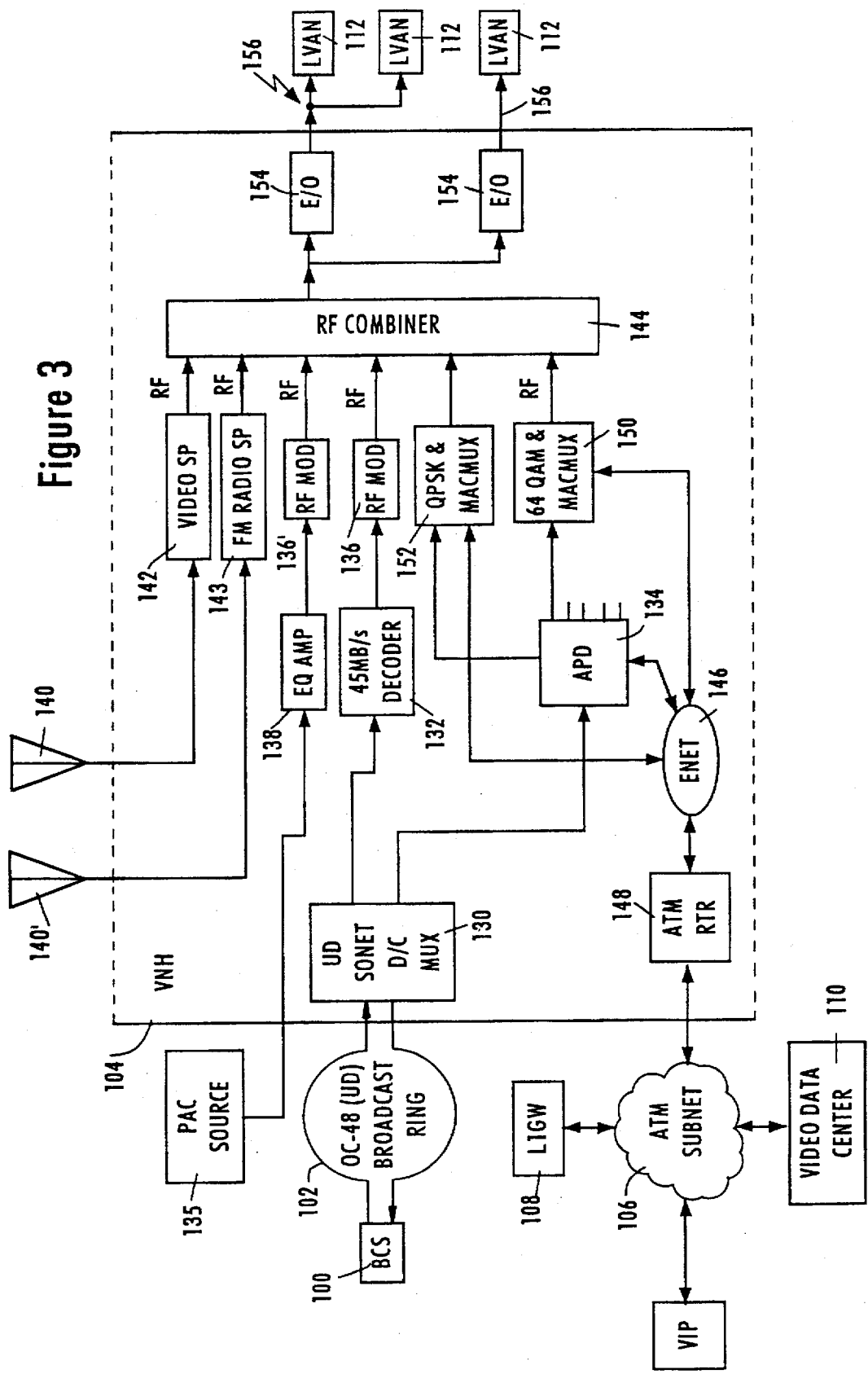
FIG. 3 is a block diagram of the video network hub shown in FIG. 2 according to the preferred embodiment of the present invention.

FIG. 3 is a block diagram of the network showing in detail a VNH 104 in accordance with the preferred embodiment of the present invention.

As shown in FIG. 3, each VNH 104, also referred to as a broadcast headend node, comprises a SONET multiplexer 130 that receives the OC-48 signal from the broadcast ring 102. The SONET multiplexer 130 is a drop-and-continue (D/C) multiplexer that "drops" the OC-48 signal from the broadcast ring 102 for local processing, and outputs the OC-48 signal to "continue" on the broadcast ring 102. The SONET multiplexer 130 converts the OC-48 signal to obtain the OC-3 ATM stream and the digitally-encoded (DS-3) baseband video signal output by the ATM edge multiplexer 120 and the digital encoder 118, respectively, as shown in FIG. 2.

The structure of ATM cells is generally recognized in the art. The ATM cell includes a header section and a payload section. In addition, the ATM cell may include additional overhead sections that provide additional vendor-proprietary features, such as priority level assignments, or forward error correction. The first byte of the header section includes a 4-bit GFC word which provides access control. The first byte of the header section also includes the lower four bits of an 8-bit virtual-path identifier (VPI). The second byte of the header section includes the upper four bits of the VPI and the first four bits of a 16-bit virtual channel identifier (VCI). The third byte includes the next eight bits of the VCI. The fourth byte of the header section includes: the last four bits of the VCI; a 3-bit payload type (PT); and a cell loss priority (CLP) bit. The fifth byte of the header section 410 includes an 8-bit header error check (HEC) word. The CLP bit is used to manage traffic of ATM cells: in the event of network congestion, cells with CLT set to 1, indicating a lower priority, are dropped before cells with CLT set to 0.

The Specific format of the ATM cell is described, for example, in the ATM User Network Interface Specification, Version 3.0, published by The ATM Forum, Mountain View, Calif., also published by Prentice Hall, the disclosure of which is incorporated in its entirety by reference. According to the ATM User Network Interface Specification, the values 0–18 for the VCI are reserved; therefore, any ATM cell having valid data must have a VCI value greater than "18". Thus, prior to transmission on the network, the ATM edge multiplexer 120 identifies ATM cells that do not have VCI values greater than "18" as idle cells that do not carry valid data.

Referring to FIG. 3, the SONET multiplexer 130 extracts the ATM cells by analyzing the input stream in 5-byte increments in order to check the header/error/check (HEC) sequence for valid ATM data; the SONET multiplexer 130 verifies the HEC sequence, extracts the 53-byte ATM cell and supplies the ATM cells to an ATM packet demultiplexer (APD) 134. Although FIG. 3 shows only one ATM packet demultiplexer 134, in the preferred embodiment the VNH 104 includes a plurality of the demultiplexers.

The VNH 104 includes an analog portion that receives analog baseband video signals from the VIPs, from a Public Access Channel (PAC) broadcast source 135, and from Over-the-Air (OTA). Specifically, the SONET multiplexer 130 outputs the DS-3 encoded baseband video signal to a DS-3 analog decoder 132, which converts the DS-3 signal back to the VIP analog baseband video signal. The VIP analog baseband video signal is output from the analog decoder 132 to a modulator 136, which includes a tuner to mix the VIP baseband video signal from the analog decoder 132 onto a specific 6 MHz bandwidth RF channel. The PAC Broadcast Source 135 provides public access channel (PAC) programming related to community activites as a PAC baseband analog video signal, preferably via an optical fiber. A fiber optic receiver 138 converts the optical signal from the PAC Broadcast Source 135 to a baseband analog PAC video signal that is supplied to a modulator 136' for mixing to a specified 6 MHz channel.

The analog portion of the VNH 104 also includes a plurality of antennas 140 that receive Over-the-Air (OTA) broadcast signals at VHF and UHF frequencies. The OTA signals are supplied to an analog signal processor 142, which performs signal conditioning and modulates the OTA signals to specified 6 MHz bandwidth RF channels. For example, the analog signal processor 142 may modulate the OTA television channels 4, 7 and 9 to 24, 27, and 29, respectively, in order to avoid interference with the PAC or VIP analog video channels. The VNH 104 may also include another antenna 140' that receives FM radio signals and supplies the FM signals to an FM radio signal processor 143. The signal processor 143 ouptuts the FM radio signal within a specified RF band, preferably the FM radio band, to the RF combiner 144.

Thus, the video signals output by the modulator 136 and the analog signal processor 142 are analog RF video signals at different 6 MHz RF channel frequencies, as well as the FM signals output by the signal processor 143. The analog signals output from the FM radio signal processor 143, the modulator 136 and the analog signal processor 142 go to an RF combiner 144. The RF combiner 144 is a passive combiner which combines the VIP, PAC and OTA analog video signals into a single video signal having a plurality of 6 MHz channels. Thus, the VIP analog video signals, the PAC analog video signals and the OTA analog video signals can be received and viewed using a conventional television set, without the need for a digital entertainment terminal.

Thus, these analog video signals could make up a basic video service analogous to the type offered by contemporary cable-TV companies. The RF combiner 144, however, enables passive combining of different baseband analog video signals, as opposed to known cable-TV systems, which require a rewire of modulators whenever a change was made in channel allocation. Thus, changes in the channel allocation in the disclosed embodiment can be made merely by reprogramming the modulator 136 and the analog signal processor 142. As discussed below, the RF combiner 144 is also adapted to combine RF signals carrying the compressed digital video signals from the VIP.

The digital portion of the VNH 104 receives the compressed VIP digital video signals from the recovered OC-3 ATM stream output from the SONET multiplexer 130. The OC-3 ATM stream is output from the SONET multiplexer 130 to one of several ATM packet demultiplexers (APD) 134 (only one shown for convenience). The APD 134 performs ATM processing by repacketizing the MPEG-2 packets on the basis of the VPI/VCI headers of the incoming ATM streams. Specifically, the ATM packet demultiplexer 134 buffers cells until it finds a cell having an ATM cell Adaptation Unit (AAU) value of "0" in its header (first cell) and another cell having an AAU value of "1" in its header (last cell). The ATM packet demultiplexer 134 counts the number of cells from first to last to determine the type of adaptation used to map cells.

If the ATM packet demultiplexer 134 has captured five cells, the receiver pulls out the payload data and uses the CRC data to check for errors. If there are no errors, the original MPEG packet is reconstructed from the appropriate bytes of payload data from the first four cells. Similarly, if the receiver has captured eight cells, the receiver pulls out the payload data, does the CRC based error check, and if there are no errors, the original pair of MPEG packets is reconstructed from the appropriate bytes of payload data from the eight cells.

The reconstructed MPEG packets are assigned a new PID value based on the VPI/VCI value of the ATM stream that carried the MPEG packets. This mapping of a new PID value in response to the VPI/VCI of the ATM stream is based upon a translation table loaded into the ATM packet demultiplexer 134 via a signaling path 146 (Ethernet or the like), discussed in detail below.

The reconstructed MPEG packets are output from the ATM packet demultiplexer 134 on one of five 27 MB/s digital signal paths to a corresponding modulator/multiplexer 150. The modulator/multiplexer 150 is a Quadrature Amplitude Modulator (QAM) operating at 64 QAM, whereby media access control (MAC) is performed to ensure proper timing of the resulting time-division multiple access (TDMA) signal. Thus, each of the five 27 MB/s digital signals are 64 QAM modulated and multiplexed into an IF signal, which is upconverted into a specific 6 MHz channel. The QAM/multiplexer/upconverter 150 outputs the 6 MHZ channels to the RF combiner 144 for combining with the other 6 MHz RF signals. The RF combiner 144 thereafter outputs the combined RF signals to multiple lightwave transmitters 154, which output the combined RF signals on an optical fiber 156 for transmission to the local video access nodes 112.

Although the disclosed network is designed to transport digital broadband data for high data-rate applications such as video, the network is also adapted to transport low data-rate information to be broadcast from an information provider to the VIUs. In such a case, the ATM packet demultiplexer 134 will determine from the VPI/VCI that the received data is a low-rate data signal; consequently, the ATM packet demultiplexer 134 would output the low-rate data signal in MPEG format to a QPSK modulator 152, which would modulate the low-rate data signal for RF transmission after passing through the RF combiner 144. The low data rate transmission may carry text or signaling information from a VIP in some way relating to one or more services offered by that VIP.

The signaling path 146 coupled to the components of the VNH 104 is preferably an Ethernet communication path. Although not shown, the Ethernet signaling path 146 provides signaling and control signals to each of the components of the VNH 104. The Ethernet signaling path 146 communicates with the video data control center 110 via the ATM backbone subnetwork 106 in order to provide the operating status of each of the components of the VNH 104. Specifically, the Ethernet signaling path 146 provides upstream signaling data to an ATM router 148, which packets the Ethernet signals in ATM format, provides a VPI/VCI header for the intended destination of the Ethernet signal, and outputs the ATM stream onto the ATM backbone subnetwork 106. The ATM backbone subnetwork 106 routes the ATM stream from the ATM router 148 of the VNH 104 to a corresponding ATM multiplexer at the video data control center 110. Preferably, the ATM backbone subnetwork 106 routes ATM streams between the VNH 104 and the video data control center 110 along dedicated virtual paths. The ATM multiplexer at the video data control center 110 receives the ATM stream, reassembles the Ethernet signals, and outputs the Ethernet signals on its local Ethernet bus with a destination corresponding to the VPI/VCI of the ATM stream. The ATM virtual circuit to the video data control center 110 is a two-way circuit and carries instructions from the video data control center 110 back to the components of the VNH 104.

Figure 4:
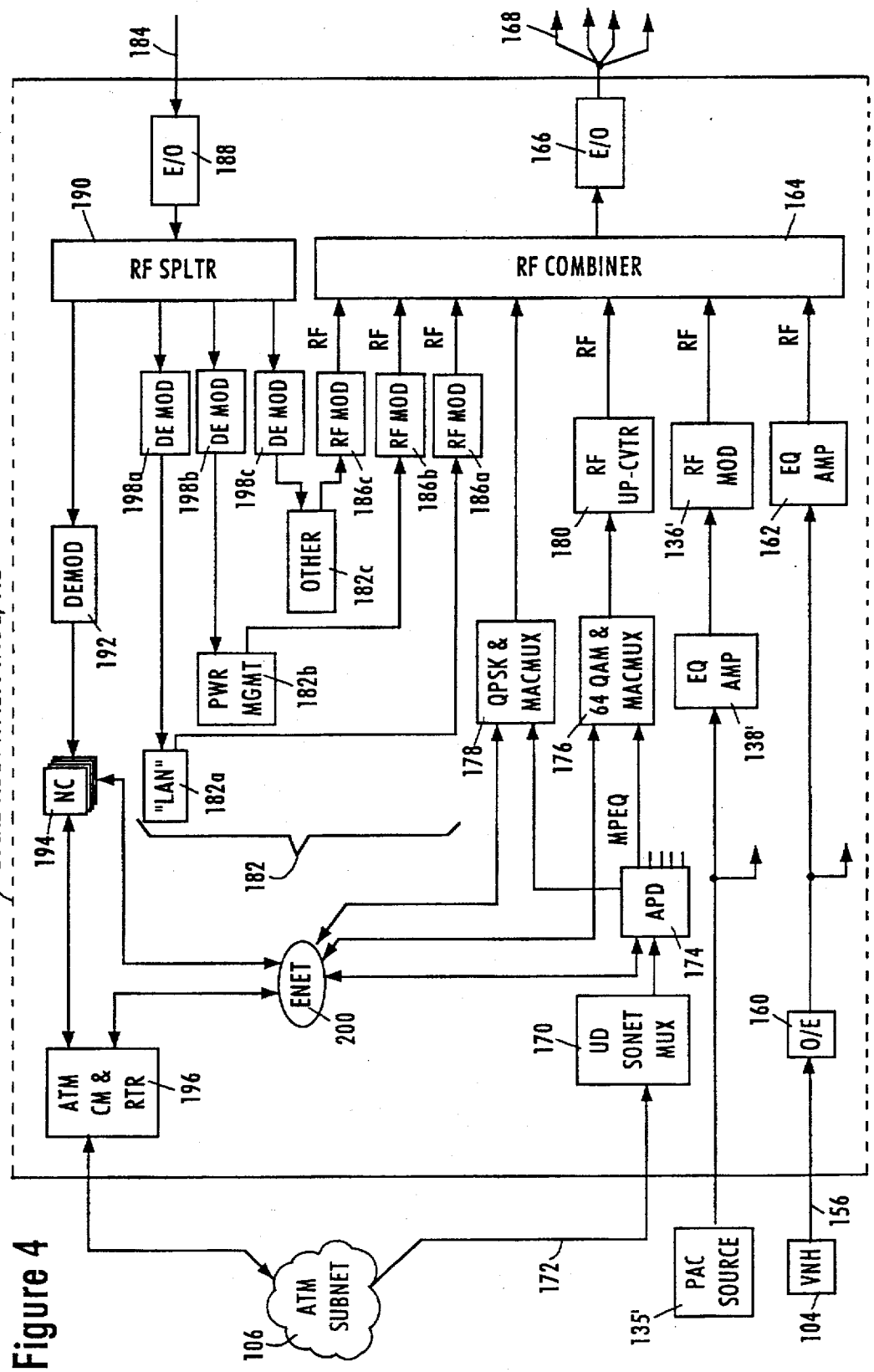
FIG. 4 is a block diagram of the video end offices shown in FIG. 2 according to the preferred embodiment of the present invention.

FIG. 4 discloses one of the network local video access nodes (LVAN) 112 according to a preferred embodiment of the present invention. The disclosed LVAN 112 is one of a plurality of LVANs that is distributed throughout the network service area in order to provide service to customers. In early implementation stages, however, it is anticipated that the first deployed LVAN 112 may be collocated with the VNH 104 in order to service a limited service area. Later deployed LVANs 112 will be located remotely from the VNH 104.

As shown in FIG. 4, the LVAN 112, also referred to as a video central office or video end office, includes an optical-to-electrical (O/E) receiver 160 that converts the optical RF signal from the optical fiber 156 to an electrical RF signal. The RF signal output from the O/E receiver 160 is supplied to an equalization amplifier 162 for signal conditioning and signal splitting before RF combination by a series of RF combiners 164, similar to the RF combiners 144 shown in FIG. 3. The combined RF signals are output from the RF combiners 164 and reconverted to an optical signals by the electrical-to-optical (E/O) transmitters 166. The E/O transmitters 166 supply the optical signals to the corresponding local loop distribution via optical fibers 168.

If desired, the LVAN 112 may also combine the RF signal from the VNH 104 with a local PAC broadcast signal supplied by a local PAC source 135. In such a case, the local PAC broadcast signal is received by a fiber optic receiver 138, which supplies the conditioned local PAC broadcast signal to the modulator 136 for conversion to an RF signal at an available 6 MHz channel before splitting and combining by the RF combiners 164.

The LVAN 112 also provides signaling traffic between the VIU and the network, as well as broadband traffic for interactive multimedia television (IMTV) sessions. Specifically, the LVAN 112 includes a SONET multiplexer 170 that receives optical signals carrying ATM streams from the ATM backbone subnetwork 106 via a unidirectional OC-48c optical fiber 172. The SONET multiplexer 170 converts the OC-48 signal into OC-3 signals carrying ATM streams. The ATM cells transport IMTV traffic and VIU signaling traffic from the VIPs and the network, respectively. The OC-3 signal is input to an APD 174, which repackets the ATM cells into MPEG format and assigns a PID value based on the VPI/VCI value of the received ATM cells. The APD 174 preferably is identical to the ATM packet demultiplexer 134 in the VNH 104.

The APD 174 determines from the VPI/VCI value whether the ATM cells transport broadband data such as video, or narrowband data such as VIU signaling information or text data. The APD 174 outputs the broadband data in one of five 27 MB/s MPEG stream to one of five 64-QAM MACMUX modulators 176. In addition, the APD 174 outputs the narrowband data as an MPEG stream to a QPSK modulator 178, which modulates the MPEG stream carrying narrowband data for combining by the RF combiner 164. The 64-QAM MACMUX modulator 176 outputs the modulated broadband signal to an RF upconverter 180, which outputs the modulated broadband signal on an available 6 MHz RF channel for combining by the RF combiner 164. Thus, the RF combiner outputs a combined RF stream carrying 6 MHz channels of information to the VIUs from different sources, including broadcast VIPs, PAC Broadcast Source 135', IMTV VIPs, and network controllers for signaling traffic.

An additional feature of the present invention is that the information output by the RF combiner 164 is not limited to broadband video from broadcast or IMTV VIPs, and signaling traffic from the network. Rather, since the VIU is able to transmit information to the LVAN 112 via a optical fiber upstream signaling link 184, the LVAN 112 may be adapted to transmit to the VIUs information from any data source. For example, reference numeral 182 denotes other data sources that can use the disclosed network for transport to the VIU: a user could remotely access a LAN source 182a using the upstream signaling link 184 for two-way communication; the network could control power to the user's DET, or alternatively work in conjunction with electric utilities to read a user's electric meter using a power management controller 182b; or a reserved port 182c could be set aside for future interactive data applications. In such a case, the data is output from one of the sources 182 to a corresponding RF modulator 186 before combining by the RF combiner 164.

Upstream signaling from the VIU is received from the upstream signaling link 184 by an E/O receiver 188, which outputs the multiplexed RF signal from the VIUs to an RF splitter 190. The RF splitter 190 splits the RF spectrum and outputs the split RF spectrum on predetermined signal paths. For example, a predetermined RF channel will contain signaling information to be supplied from the VIU to the Level 1 gateway 108, such as a request for new service, or a request for an IMTV session with a VIP via a Level 2 gateway. This VIU signaling information will be supplied to a demodulator 192 to demodulate the signaling information off the RF carrier. The demodulator 192 will output the demodulated VIU request to one of thirteen (13) network controllers (NC) 194, each of which processes the VIU request and identifies the destination for the request. The NC 194 passes the VIU request to an ATM router 196, which receives inputs from the network controllers, packets the VIU request in an ATM cell stream, adds a VPI/VCI header to identify the destination of the request, and outputs the ATM stream onto the ATM backbone subnetwork 106. The processing of the VIU request is discussed in more detail below with respect to FIG. 6.

As discussed above, the upstream signaling link 184 may provide upstream signaling data for the other data sources 182. For example, the RF splitter 190 outputs an RF signal at a predetermined band to one of the demodulators 198 corresponding to the devices 182. The demodulators 198 remove the RF carrier signal and output the demodulated signal to the corresponding device 182.

As discussed above with respect to FIG. 3, the VNH 104 includes an Ethernet control network to control the components of the VNH 104. Similarly, the LVAN 112 comprises an Ethernet system 200 for controlling the components of the LVAN 112. As discussed in detail below with respect to FIG. 6, the Ethernet system 200 communicates with the network via the ATM router 196, which passes Ethernet messages between the Ethernet system 200 and remote Ethernet systems via the ATM backbone subnetwork 106.

Figure 5:
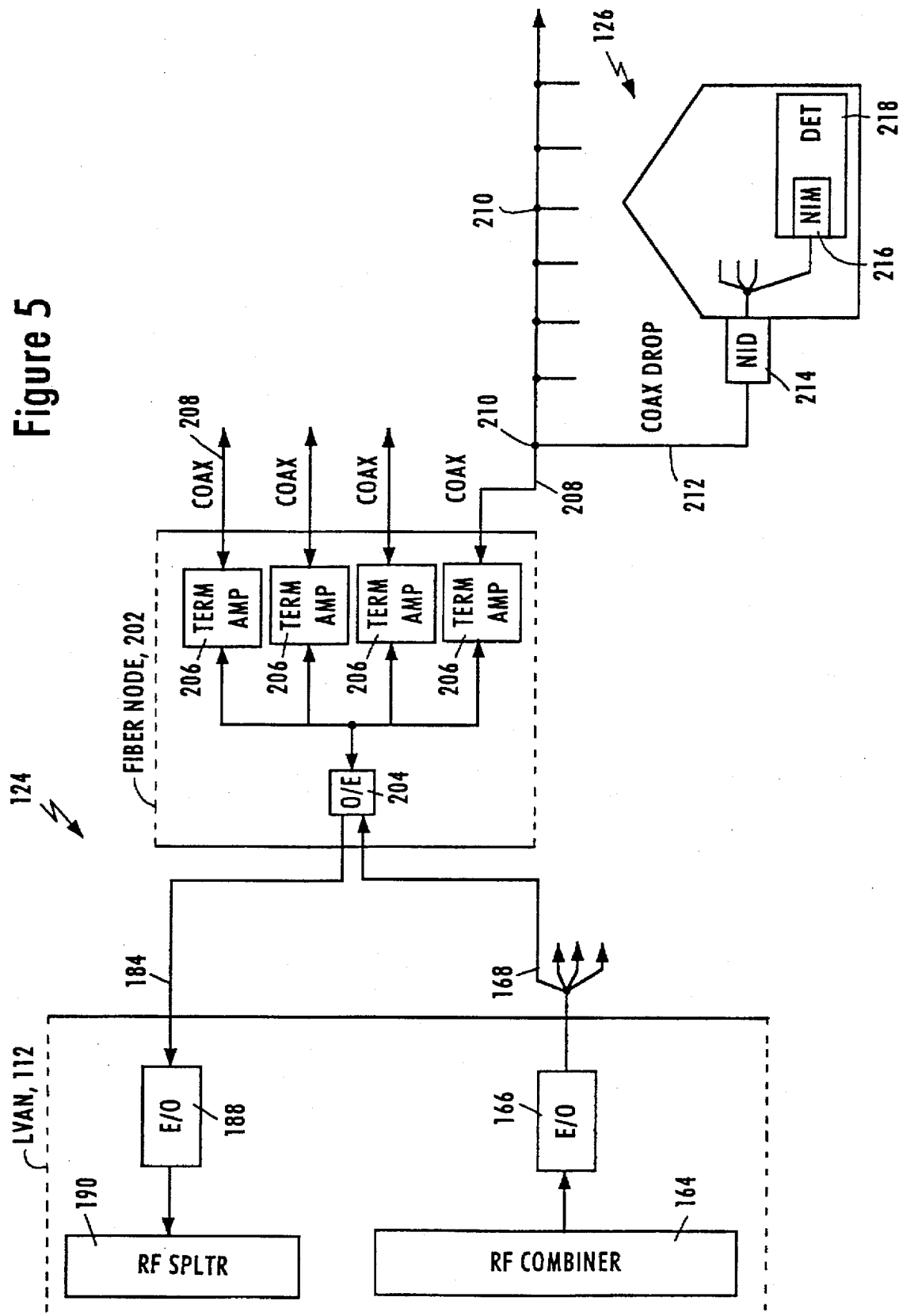
FIG. 5 is a block diagram of the access subnetwork shown in FIG. 2 according to the preferred embodiment of the present invention.

FIG. 5 discloses an exemplary implementation of the local loop distribution network 124 shown in FIG. 2 in accordance with the preferred embodiment of the present invention. Although the local loop distribution 124 shown in FIG. 5 is a hybrid-fiber coax system, one having ordinary skill in the art will appreciate that other local loop distribution systems may be used, such as Asymmetrical Digital Subscriber Loop (ADSL), Fiber-to-the-Curb, or direct fiber to the living unit.

As shown in FIG. 5, the combined RF signal output from the RF combiner 164 is converted to an optical signal by the E/O transmitter 166 and output to the local loop distribution 124 on the optical fibers 168. Generally, the optical signal will be provided to a plurality of optical fibers via an optical splitter, preferably a maximum of four optical fibers per combiner 164. Each optical fiber 168 carries the combined analog RF signal to a fiber node 202. According to the preferred embodiment, each fiber node 202 is designed to serve one broadcast service area (BSA) of up to 500 homes passed. The fiber node 202 comprises an O/E transceiver 204 that converts optical and electrical RF signals to and from a plurality of terminal amplifiers 206, respectively. Each terminal amplifier 206 outputs the electrical RF signal onto a coaxial cable 208. The coaxial cable 208 is designed to pass one hundred twenty five (125) homes. Specifically, a tap 210 is installed along the 208 for each living unit that wishes activation on the network. A coaxial drop cable 212 is wired between the 210 and the customer premises 126. Thus, assuming each home receives a tap 210 for service on the network, each coax cable 208 will service up to 125 homes.

As shown in FIG. 5, the customer premises 126 includes a network interface device (NID) 214, a network interface module (NIM) 216, and a digital entertainment terminal (DET) 218. The NID 214 receives the coax drop 212 and splits the RF signal into up to four coax signal paths. Each home or living unit 126 is preferably allocated a capacity of up to four digital entertainment terminals 218 (DET's). Each coax feed is supplied to the NIM 216, which demodulates the RF signal at a user-specified channel frequency. If the demodulated RF signal is an analog video signal from an analog source (such as the PAC 135), the NIM 216 passes the baseband or RF analog video signal directly to the television set (not shown) without further processing by the DET 218.

If, however, the NIM 214 receives an MPEG encoded signal, the NIM 214 will de-encrypt the 27 Mb/s MPEG encoded signal using a key downloaded from the network's ACC-4000D (described in detail below). Upon de-encrypting the MPEG encoded signal, if the MPEG encoded signal has a PID value corresponding to the NIM address, the NIM 214 processes the MPEG stream as NIM signaling data; if, however, the PID value corresponds to the DET address, the NIM 214 decompresses the MPEG stream as DET signaling data and outputs the same to the DET CPU. Otherwise, the MPEG stream is passed to the DET as information-carrying (e.g., video) MPEG streams. The MPEG processor within the main portion of the DET 218 identifies an MPEG stream to be transmitted to the DET 218 by the PID value. Thus, the DET 218 decodes only an MPEG stream having a specified MPEG PID value in accordance with the user's request for service.

The DET of the present invention is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software, and at least one VIP (the VIP selling the DET) can download all or a part of the operating system. In non-volatile memory (ROM and non-volatile RAM), the DET will store a loader program and an operating system. The loader program and operating system in the ROM and the non-volatile RAM will include sufficient programming to control initial communications and define interfaces and drivers, e.g. for graphics to define the base line functionality of the DET for all service applications the DET will run.

The DET 218 receives selected MPEG streams from the NIM 214, and decompresses selected MPEG packets in order to recover the original digital signal. If the digital signal is narrowband signaling information for the DET 218, the signaling information is supplied to the DET microprocessor for appropriate processing. If the digital signal is broadband information, the DET determines whether the signal is digital video data or other broadband data, and supplies the data to the television or the DET microprocessor, accordingly.

With the present invention the DET 218 is adapted to receive and store downloaded control software. The DET 218 can establish a link to the network via a level 1 gateway session to receive operation systems code, default channel maps, and permissions tables in order to receive broadcast services from multiple VIPs. In some cases, the DET may also establish a point to point link to a VIP's interactive equipment. For broadcast services, the DET captures a cyclically broadcast application, for example navigation software.

According to the present invention, the DET 218 identifies control software from video data on the basis of PID values. For example, the DET 218 will receive a program association table (packet PID 0) that maps each program source with the PID value associated with a program map related to that source. Thus, the program association table defines the packet location in the transport stream of a program map for each source of programming in the transport stream. The program map, in turn, specifies the PID values for packets continuing video, audio and/or data from the particular source. For example, the program map for CBS might be found in packets corresponding to PID 132; the program map for NBC might be found in packets identified by PID 87 and so forth. The program map for CBS in the packet with PID 132 would then identify the PID numbers for the actual packetized elementary streams (PES) for the video and audio channels associated with the CBS program.

One should note at this time that more than two PID's may be associated with programming from one source. For example, there could be a data channel associated with the program which would include data for closed captioning for the hearing impaired. There could be a number of audio elementary streams, for example, carrying respective different languages. Thus the programming map provides some flexibility beyond that required for merely associating a single video and audio elementary stream.

Once the DET 218 identifies and captures the programming map, the program decoder can extract the video elementary stream, the audio elementary stream(s) and any associated data stream for decoding of the programming.

Within an identified video elementary stream, video sequence headers define things like frame rate, resolution, and the coordinates on the screen where display of the image should begin. Such coordinates are useful, for example, in defining pictures within a picture when multiple pictures are superimposed. In each video stream packet, after the video header sequence, the packet contains the actual video syntax which, in the case of MPEG, includes the normal frames associated with video compression, such as I frames and B frames, etc., in MPEG.

Although not shown in FIG. 5, the NIM 216 presents two connections to the DET 218, a high bit rate broadband connection and a low bit rate signaling connection. The broadband connection is a one-way downstream only connection, but the low-bit rate signaling connection is a two-way connection. For example, the network interface module 216 would include means to multiplex and demultiplex signals for transmission/reception over the coaxial cable 212.

The network interface module 216 may be implemented in the form of a plug in module. In one embodiment, the NIM 216 would be similar to a daughter board or option card which can be plugged into a back plane of a personal computer (PC). In such an embodiment, typically a technician could replace the module in either the field or the shop, to modify a DET 218 to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the DET and input/output connections compatible with all of the digital broadband networks currently available. The downloaded operating system software stored in the system memory of the DET would control operations of the digital signal processor to send and receive signals in accord with the particular network the subscriber chooses to connect the DET to.

Nevertheless, the NIM 216 provides the interface necessary for the DET 218 to communicate with the local loop distribution 124. Thus, it is desired that while the NIM 216 is dependent on the local access technology being implemented (in this case, hybrid-fiber coax), the NIM 216 provides standardized control signals to and from the DET 218, such that the DET 218 can be implemented as a generic consumer product that is independent of the local access technology, whether it is hybrid-fiber coax, ADSL, satellite receiver, or fiber to the curb.

In addition, the NIM 216 according to the preferred embodiment stores the encryption keys that are supplied from the APD 174 via the downstream signaling channel output on the 64-QAM MACMUX modulator 176 and the RF upconverter 180 in FIG. 4. Thus, a user's DET 218 receives only authorized MPEG data streams, thereby improving network security and reducing the ability of unauthorized users from accessing other video programming.

According to the preferred embodiment, an authorized user can request an IMTV session with a VIP so that the corresponding level 2 gateway and associated server can download application program software to the application memory in the DET. The DET can receive and load software applications either through one or more broadcast channels or through a signaling channel. The downloaded applications software controls a wide variety of DET functions in accord with each VIP's services. For example, this software may specify the functionality of the user interface (UI), navigation through broadcast channels, types of transactions to be performed, graphics styles, etc. At least some of the software/data downloaded through a broadcast channel preferably controls "channel mapping" functions of the DET, to permit an end user to easily navigate through the channels carrying the services of each broadcast VIP. Once all necessary software resides in memory in the DET, the user begins interaction with the services offered by the particular service provider or VIP.

The downloaded software from one service provider or VIP might present menus and prompts in simple text form. Another provider, however, might choose to present menus and prompts in a much more graphical form approaching virtual reality. Graphics and a small number of frames of video can be downloaded and stored with the application software.

In accordance with the preferred embodiment of the present invention, the disclosed broadband network utilizes certain broadcast channels as VIP control channels to continuously transmit software control signals. For example, the DET is downloaded with a default channel map from the Level 1 gateway 108. Part of that map may identify by broadcast channel and PID value control channel information for basic services. In order to obtain premium access from a particular VIP, the user would request a level 1 gateway session in order to receive the connection block descriptors (including RF channels and PID values) and any encryption keys for the control channel of a selected VIP. Once the DET stores the connection block descriptors and the NIM stores the encryption keys, the user is able to decode the VIP software control signals. The software control signals allow any user to randomly identify and select available VIP services, and may include navigation software which includes instructions for controlling selection of video services and a program or channel map for identifying the RF channel and the PID values for video, audio, or data packets for each program service. The program map information at least facilitates rapid channel changes (channel surfing) through the VIP's broadcast services, using channel identifiers arbitrarily selected by the VIP, for convenience and/or ease due to user acceptance.

Such navigation software, when loaded by the DET, may also be implemented as a menu program operating as an electronic TV Guide that is recalled each time the user presses a predetermined button, for example "GUIDE", on the remote control. In this example, the first time a user presses the "GUIDE" button on a remote control after turning on the DET, the DET jumps to the control channel broadcasting the navigation software for the network or for a predetermined VIP. From that channel, the DET captures and executes the navigation program in realtime. Thus, real-time execution minimizes the amount of memory necessary for the DET; in addition, there is no need to establish a level 1 or level 2 gateway session to download software, thereby minimizing network traffic. Alternately, the DET may initially download a portion of the software (e.g. the executable code) during turn-on, and access menu data from the control channel when the user presses "GUIDE"; this variation will result in an increase in the execution speed of the navigation software. In another variation, the DET may download software and data during turn-on, and subsequently download only update data.

During use by a user, the DET at turn-on enters a mode for reception of the broadcast service. In such a case, the non-volatile memory in the DET stores operating system software including instructions for controlling selection of the broadcast services and a primary channel map for identifying control channels of VIPs that are available on the network. The non-volatile memory may be loaded at the factory, or by a level 1 session with the network during registration of the DET. If interactivity with a particular VIP is desired, the level 1 gateway would be accessed in response to a user operating an appropriate button on the remote control, after which the user would select a VIP, and the DET would interact with the VIP's level 2 gateway and file server to obtain applications software programming and/or operating system changes, as discussed in more detail in commonly-assigned application Ser. No. 08/250,791, filed May 27, 1994, the disclosure of which is hereby incorporated in its entirety by reference.

Alternatively, in networks carrying broadcast services, the DET would turn-on with a loader program that executes a mode for scanning the broadcast channels for tag data for corresponding VIP's. Once scanning is complete, the DET will have compiled a primary channel map including the information necessary to access one of the available VIP services. The stored program/channel mapping tables permit users to select channels with a standard channel number even though the program may be carried on an unrelated channel within the network. For example, one broadcast provider might carry the local NBC station on channel 17, another broadcast provider might carry that station on channel 77, and the local over the air broadcast would be on standard RF TV channel 4. If the user selected the first provider, the mapping table would indicate that broadcast channel 4 is carried on network channel 17. If the user selected the second provider, the mapping table would indicate that broadcast channel 4 is carried on network channel 77. In either case, the user would select the channel simply by inputting the number 4. The subscriber does not need to know which network channel each VIP uses for that broadcast service.

Although prior systems allowed the same DET to be used in a variety of different networks only with a substitution of a different network interface module to adapt the DET to each particular network, a user's DET can be fully compatible with any network that broadcasts VIP tag data in accordance with the present invention, regardless of the content of a particular broadcast channel. A more detailed description of the structure of the DET and the operations thereof involved in downloading applications software and operating system changes into the DET are disclosed in copending application Ser. No. 08/380,755, filed Jan. 31, 1995 (attorney docket No. 680-083C), incorporated herein in its entirety by reference.

Figure 6:
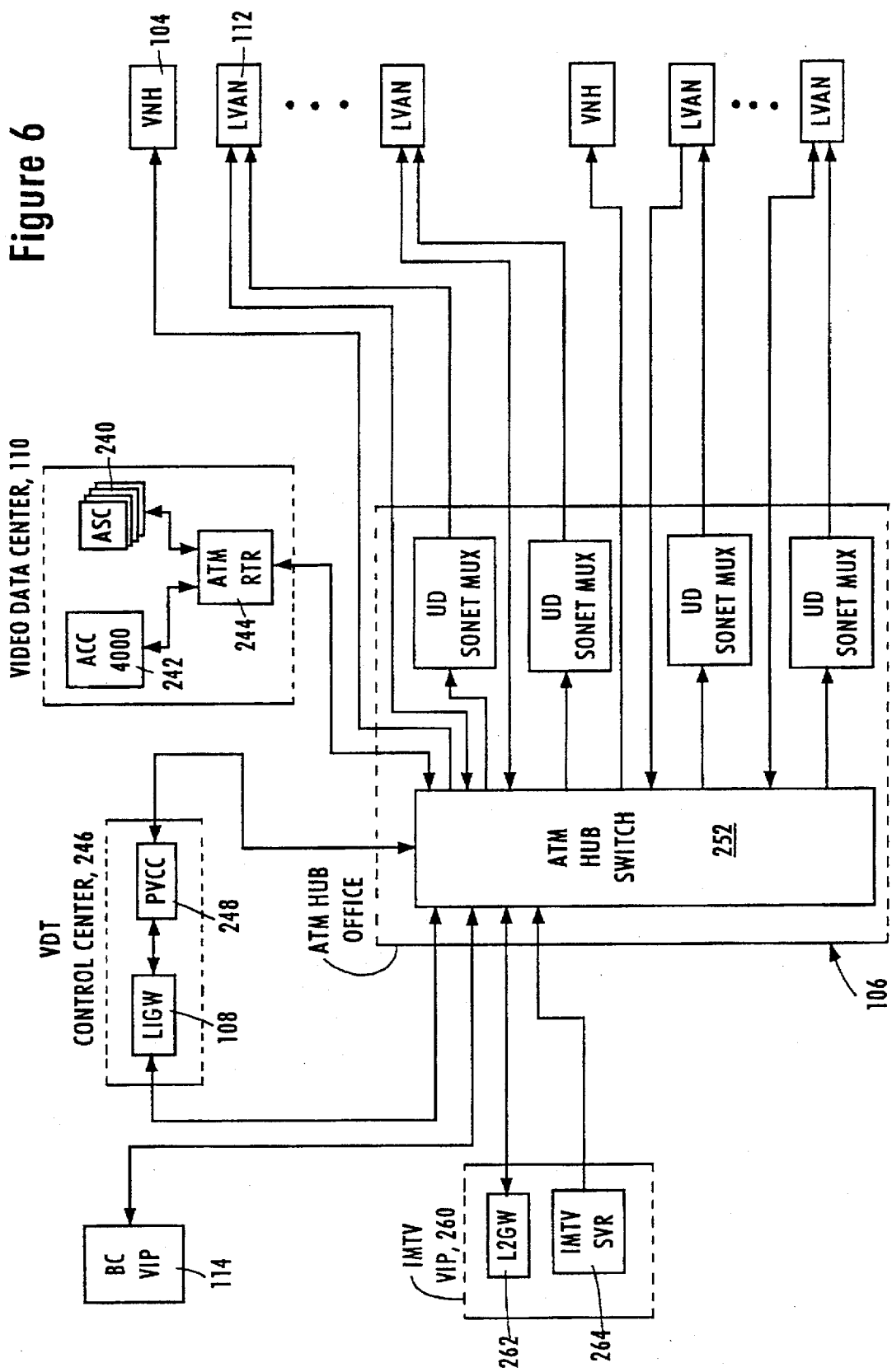
FIG. 6 is a block diagram of the ATM backbone network and the control systems for the full service network shown in FIG. 2.

FIG. 6 is a block diagram illustrating the relation of the ATM backbone subnetwork 106, the video data control center 110, and a Video Dial Tone (VDT) control center including the level 1 gateway 108 shown in FIG. 2. As shown in FIG. 6, the video data control center 110 includes a access subnetwork controller (ASC) 240, an ACC-4000 242, and an ATM router 244 for sending and receiving ATM cell streams to and from the ATM backbone subnetwork 106. The VDT Control Center 246 comprises the level 1 gateway 108 and a Permanent Virtual Circuit (PVC) controller 248.

The ATM backbone subnetwork 106 comprises at least one ATM hub office comprising an ATM switch 252, and a plurality of unidirectional SONET multiplexers 254. Although only four (4) SONET multiplexers 254 are shown in FIG. 6, it should be understood that all physical connections to and from the ATM switch 252 are preferably at a transmission rate of OC-3. In future embodiments serving larger numbers of VIU's and interactive service VIP's, the ATM backbone subnetwork 106 will include local access ATM switching offices connected to the hub ATM switch 252.

According to the preferred embodiment, the ATM switch 252 routes all ATM streams on the basis of the VPI/VCI of the cell streams. The ATM stream virtual path is controlled by the PVC controller 248, which provides switching control to the ATM switch 252 to set up the virtual paths in the ATM switch 252 from the source to the destination in response to assignments from the level 1 gateway 108. Thus, the level 1 gateway 108 communicates with the PVC controller 248 for all management functions and path assignments in the ATM subnetwork. In addition, each VNH 104 and LVAN 112 is assigned a predetermined virtual path for communication with the video data control center 110, thereby relieving management requirements by the PVC controller 248. Thus, upstream signaling traffic from a VIU to the level 1 gateway 108 or the video data control center 110 is routed along dedicated virtual paths.

The access subnetwork controller 240 controls all routing of broadband and narrowband data throughout the network in response to bandwidth requirements supplied from the level 1 gateway 108. For example, in the case of broadcast services such as pay-per-view, the broadcast VIP 114 may desire to broadcast broadband data to be transported by the network. As shown in FIG. 6, the broadcast VIP 114 communicates with the Level 1 Gateway 108 via the ATM backbone subnetwork 106 to exchange interactive broadcast signaling information in order to request a specified bandwidth at a scheduled time. Alternatively, the broadcast VIP 114 may communicate with a business office in the network, whereby the broadcast information is loaded from the business office into the level 1 gateway 108. The level 1 gateway 108 will send an instruction at the scheduled time to the access subnetwork controller 240 that bandwidth is required for a specified duration for an ATM stream having a specified VPI/VCI header from VIP to the broadcast consolidation section 100 disclosed in FIG. 2. In response thereto the access subnetwork controller 240 sends signaling messages througout the network to establish the bandwidth: the ATM edge multiplexer 120 receives a message that the specified VPI/VCI is permitted to pass into the network; and the ATM packet demultiplexer 134 is loaded with the appropriate PID values to map the ATM stream to an MPEG stream having a specified MPEG format. The access subnetwork controller 240 will also send an instruction to the ACC-4000 242 to send an encryption key to the ATM packet demultiplexer 134 to encrypt the program before RF transmission to the LVANs 112.

At the customer premises as shown in FIG. 5, an authorized VIU will have downloaded into the NIM 216 the encryption key from the ACC-4000 242 via a control channel (broadband) or an out-of-band signaling channel.

If an unauthorized user wishes to subscribe to the VIP 114, the user will use the DET 218 to request a session with the Level 1 gateway 108 in order sign up for the video service. Thus, the DET 218 will send a request for a Level 1 gateway session upstream to the LVAN 112 via the fiber node 202. The LVAN 112 uses the RF splitter 190 to split the combined RF signal from the fiber node 202, and supplies the request to the network controller 194. The network controller identifies the VIU request as a request for the level 1 gateway 108, and outputs the request for the level 1 gateway 108 via Ethernet 200 to the ATM router 196, which packets the request with the appropriate VPI/VCI value in order to reach the level 1 gateway 108 along a dedicated virtual path within the ATM subnetwork 106.

As shown in FIG. 6, the VIU request is supplied from the LVAN 112 to the level 1 gateway 108 via the ATM switch 252. Although not shown in FIG. 6, the VDT Control Center 246 includes a corresponding ATM router to repacket the ATM cells and supply the request to the Level 1 gateway.

The Level 1 Gateway 108 sends a menu and a banner through the via the ATM backbone subnetwork 106, to the LVAN 112 and out to the DET along a narrowband signaling channel. According to the preferred embodiment, the menu is a screen of text listing VIP's available to this customer or the VIP's that the customer has previously selected for purposes of her customized menu presentation. The subscriber reviews the menu on their television set, and operates the arrow keys on the DET remote control to move a cursor across the menu to an appropriate point on the screen, after which the user presses an <ENTER> key on the keypad or remote control. In response to the VIP selection input, the DET transmits an appropriate data signal upstream through the network to the Level 1 Gateway 106.

The Level 1 Gateway ATM switch 252 may execute a PIN number access routine, if the subscriber has previously requested such access control for selected ones of the VIP's. For simplicity here, it is assumed that the currently selected VIP is not subject to such a PIN number requirement. The Level 1 Gateway is merely expecting to receive the VIP selection input from the DET 238 within a predetermined period following the menu transmission. If the Level 1 Gateway 108 receives the selection input message from the DET within a predetermined period, the Level 1 Gateway 108 begins tracking billing for that user, and instructs the access subnetwork controller 240 that the VIU is an authorized user. The access subnetwork controller 240 thereafter instructs the ACC-4000 242 to supply an encryption key to the VIU for the broadcast VIP 114, thereby enabling the VIU to de-encrypt the MPEG data from the VIP.

The VIU will also access the level 1 gateway 108 as described above in order to initiate an IMTV session with an IMTV VIP 260. The IMTV VIP 260 shows in more detail the IMTV components in the VIP 116 discussed above with respect to FIG. 2. As shown in FIG. 6, the IMTV VIP 260 includes a Level 2 gateway 262 for communication with the Level 1 gateway 108 via the ATM backbone subnetwork 106, and an IMTV server 264 for outputting broadband video data in ATM streams to the ATM backbone subnetwork 106. To establish a broadband communication session or connection through the network between the level 2 gateway 262 and a particular DET 238 requires establishment of a virtual circuit through the ATM switch 252 and the appropriate LVAN 112. In the network of FIG. 6, the PVC controller 248 stores data tables defining all possible virtual circuits through the ATM switch 252 to the LVANs 112. The data tables in the PVC controller 248 define the header information and the particular fiber output port used to route cells to the correct LVAN 112. The data tables thus define "permanent virtual circuits" (PVC's) between the providers and LVAN 112 servicing the DET's.

When the level 1 gateway 108 receives the request for an IMTV session with a selected VIP, the level 1 gateway 108 connects with the Level 2 gateway 262 of the selected VIP via the ATM subnetwork 106 and asks the Level 2 gateway 262 if it wishes to establish an IMTV session with the requesting VIU; if the level 2 gateway 262 declines the request, the level 1 gateway 108 terminates the connection. If, however, the level 2 gateway 262 acknowledges the request from the level 1 gateway 108, the level 1 gateway 108 specifies the necessary bandwidth to the access subnetwork controller 240 and the PVC controller 248. In addition, the level 1 gateway 108 instructs the level 2 gateway 262 what VCI value should be added to the output ATM stream from the IMTV server 264, assuming that the IMTV VIP 260 has a predetermined VPI address.

The access subnetwork controller 240 and the PVC controller 248 maintain an inventory of bandwidth in use and available bandwidth througout the ATM subnetwork 106, throughout each VNH 104, and each LVAN 112. Referring to FIG. 4, the Level 1 gateway 108 sends an instruction that a certain amount of bandwidth is needed for an IMTV session between the IMTV VIP 260 and a VIU. For example, the Level 1 gateway 108 may specify a rate of 1.5 MB/s, 3 MB/s, 6 MB/s, up to 15 MB/s; since one 6 MHz program channel can carry up to 27 MB/s, the APD 174 can arrange one 15 MB/s stream per channel, four 6 MB/s streams per channel, eight 3 MB/s streams per channel, or sixteen 1.5 MB/s streams per channel. In response to the instruction from the level 1 gateway 108, the PVC controller 248 sets up the downstream virtual path through the ATM backbone subnetwork 106 for broadband data from the IMTV server 264 to one of the ten (10) APD's 174 of the LVAN 112. The access subnetwork controller 240 sets up the path downstream of the APD by loading that APD 174 with the VPI/VCI of the ATM stream to be received from the ATM backbone subnetwork 106, as well as the translated PID values to be inserted into the repacketed MPEG packets. The access subnetwork controller 240 also instructs the APD 174 which output rail to place the MPEG packets on. Thus, the video data from the 264 is transmitted to the DET as MPEG packets having specific PID values.

If the broadband communication connection is successfully established between the VIP's server port 264 and the customer's DET 218, the access subnetwork controller 240 transmits back an appropriate indication thereof to the Level 1 Gateway 108 for billing purposes. The Level 1 Gateway informs the level 2 gateway 262 that it has set up a good broadband link, and the Level 1 Gateway 108 initiates a billing record for the call. Alternatively, if the access subnetwork controller 240 informs the Level 1 Gateway 108 that it could not establish the broadband connection, the Level 1 Gateway passes that information on to the level 2 gateway and provides an appropriate message for display by the DET informing the customer.

During the communication session between the subscriber and the IMTV VIP 260, the DET 218 can transmit control signalling upstream through the ATM subnetwork 106 to the level 2 gateway IMTV VIP 260. The level 2 gateway IMTV VIP 260 can also send signaling information, such as control data and text/graphics, downstream through the same path to the DET. For downstream transmission, the server 264 will provide ATM cells with an appropriate header. The ATM switch 252 will route the cells using the header and transmit those cells to the APD 174 serving the requesting subscriber 236 for conversion to MPEG format. Typically, the downstream signaling from the VIP is included as user data (in-band) as part of the broadband MPEG packet stream transmitted to the DET.

When an interactive broadband session ends, e.g. as indicated by an exchange of appropriate messages between the DET 218 and the level 2 gateway 262, the level 2 gateway 262 instructs the Level 1 Gateway 108 to tear down the broadband connection. The instruction includes the customer's billing address and the server port identification for the VIP port used for the broadband communication. In response, the Level 1 Gateway 108 stops the billing timing for that broadband session and transmits and instruction through the PVC controller 248 and the access subnetwork controller 240 to tear down the broadband connection between the server port and the customer's broadband port. The Level 1 Gateway 108 creates a log record of the interactive broadband call for purposes of billing the IMTV VIP 260 for the broadband connect time. A more detailed description of the Level 1 Gateway functionality is found in commonly-assigned copending application Ser. No. 08/304, 174, filed Sep. 12, 1994 (attorney docket No. 680-093), the disclosure of which is incorporated in its entirety by reference.

A description will now be given for activation of a new customer. When a party requests activation of a new customer (typically requested by a VIP selling video services to new subscribers or a contractor selling DET's to consumers), that party sends an activation request to the network company's operations support system (OSS). That request includes a variety of customer related information, as well as the number of DET's this customer is purchasing. The OSS will assign and return an E.164 address for each DET. The party activating the DET's will enter the respective E.164 address into each DET, using the remote control, the television display and an initialization routine programmed into the DET. The entered E.164 is thereafter considered the DET's global ID.

As discussed above with respect to FIG. 5, each DET will connect into a fiber node 202 serving up to 500 homes. One access subnetwork controller 240 as shown in FIG. 6 will control a number of fiber nodes 202 through the respective LVAN's. For each DET of the new customer, the OSS will transmit a message to the level 1 gateway, which sends an activation request to the video manger 240 that will service the customer. This activation request provides necessary information for activating service, including the node ID for the new customer and the E.164 address of each DET 218, to the access subnetwork controller 240.

According to the preferred embodiment, each DET 218 is assigned a default RF channel for downstream signaling with the level 1 gateway 108, the ACC-4000 242, the elements of the local video access node 112 and the access subnetwork controller, as well as for upstream signaling. The downstream default channel preferably provides each DET 16 kbits/s of signaling capacity within a 1.5 Mbits/s stream which is QPSK modulated by the QPSK modulator 178 shown in FIG. 4 into a portion of the RF spectrum not used for broadband transmission. Also, the NIM 216 of the DET 218 includes a QPSK transmitter for sending signaling information upstream through the hybrid-fiber-coax loop distribution plant (FIG. 5) on an assigned channel outside the portion of the spectrum carrying the broadband transmissions. The upstream signaling channel is preferably 400 bits/s.

In response to the activation request from the level 1 gateway, the access subnetwork controller 240 assigns default channels to each new DET. The access subnetwork controller 240 also assigns VPI/VCI values for communications between the DET 218 and the level 1 gateway 108.

When the access subnetwork controller 240 assigns the bandwidth for the default signaling channels, the access subnetwork controller 240 gives the E.164 address and the QPSK values for the downstream default channel to the ACC-4000 242. The ACC-4000 242 in turn assigns a NIM network address to the new DET. The NIM network address is also correlated with the assigned upstream default channel bandwidth. In the presently preferred embodiment, the NIM network address represents a PID value for MPEG packets carried on the assigned downstream QPSK modulated signaling channel. The ACC-4000 242 transfers the E.164 and the NIM network address to the QPSK modulator 178 for broadcast on the downstream default channel.

As part of the initialization routine noted above, the DET 218 will generate an initialization menu for display on an associated television. As part of the resultant initialization procedure, the DET 218 will prompt for and receive a keyed input of the assigned E.164 address. The main portion of the DET 218 will transfer the E.164 address to memory in the NIM 216. When the user or technician connects the NIM 216 to the hybrid-fiber-coax distribution line, the new NIM 216 will scan for and capture the broadcast transmission containing the E.164 address and the NIM network address. The NIM 216 will also capture other relevant information, such as the channel assignments for the upstream and downstream default signaling channels.

After the NIM 216 is initialized with the network address etc., the DET 218 transmits back an acknowledgement signal to the access subnetwork controller 240. The access subnetwork controller 240 in turn provides appropriate information to the various network nodes, e.g. the level 1 gateway 108 and the ACC-4000 242, indicating that the DET 218 is now activated. The level 1 gateway 108 sets up a communication with the DET 218 and downloads a default channel map and connection block descriptors for the channels the subscriber is permitted to receive. Similarly, the ACC-4000 242 sets up a communication with the DET 218 and downloads decryption keys for the channels the subscriber is permitted to receive. The decryption keys are stored in memory in the NIM 216. The level 1 gateway 108 and the ACC-4000 242 will update the data stored in the NIM/DET as necessary, e.g., if the subscriber changes the services to which she subscribes.

When the subscriber selects a digital broadcast channel, the main portion of the DET 218 supplies the RF channel number from the connection block descriptor for that channel to the NIM 216. The NIM 216 will tune to the identified channel, and the NIM 216 will use the encryption key from its memory to descramble the tuned RF signal. As a result, the NIM 216 passes digital signals from the RF channel through the interface to the main portion of the DET 218. In turn, the main portion of the DET 218 uses the PID value from the connection block descriptor to begin MPEG decoding of the selected program. Thus, for broadcast services, the DET/NIM stores all necessary permission data and can begin reception and decoding in response to a selection by the user, without any upstream signaling to any other node of the network.

The default channels and corresponding default VPI/VCI values provide dedicated two-way signaling communications from the DET 218 up as far as the level 1 gateway 108. For example, the DET 218 sends a message to the level 1 gateway by QPSK modulating the appropriate data in the upstream default channel. The network controller 197 shown in FIG. 4 receives the message and passes the message to the ATM router 196 which repacketizes the message as one or more ATM cells identified by the upstream default VPI/VCI value for communication with the level 1 gateway 108. The ATM router 196 sends the ATM cell(s) through the ATM switch network 106 to the level 1 gateway 108. For messages from that gateway intended for the particular DET, the level 1 gateway 108 formulates an ATM cell containing the downstream message data. This cell uses the downstream default VPI/VCI value. The ATM switch routes this cell through the APD 174 to the QPSK modulator 178 in the local video access node 112 serving this subscriber. The APD 174 repacketizes the data from the ATM cell payload as an MPEG packet data message bearing the NIM network address PID, and the QPSK modulator 178 transmits that message through the QPSK signaling channel for downstream default signal transport.

For a pay per view service, the level 1 gateway 108 transmits the connection block descriptor for the pay per view channel through the downstream default channel to the DET 218 at a specified preview time, e.g. 15 minutes before the event. The NIM will recognize the address in the broadcast on the its assigned default channel and capture the data packet. The NIM will strip off the address information and pass the connection block descriptor to the main portion of the DET 218 to permit the reception of the pay per view event channel if selected by the viewer. During the preview time, the NIM uses a first encryption key. The NIM 216 will not have the encryption key for this channel for the full event unless and until the viewer purchases the pay per view event. A subscriber negotiates with a VIP 114 to order a pay per view event in any of several possible ways. The VIP's equipment identifies the subscriber by E.164 address and sends an event number with the E.164 address to the ACC-4000 242. Before the start of the event, the ACC-4000 242 transmits a message to the DET 218 using the NIM network address via the default channel assigned to the particular DET 218. This message specifies start time, event duration and the encryption key needed to decode the selected event. The NIM 216 monitoring its default channel, recognizes its network address and captures the packet of message data for further processing. In the present case, the NIM 216 responds to the message by adding the encryption key for the program to its memory and stores the duration information. At the end of the specified duration, the NIM 216 deletes the encryption key for the program from its memory. At the appropriate times, the DET 218 will receive and decode the pay per view event in essentially the same manner as for other broadcast services, using the connection block descriptor and the encryption key.

As disclosed above, the present invention provides a distributed architecture designed to provide video services over a greater serving area, thereby minimizing the need for expensive signal processing devices. In addition, the present invention provides a network configuration that enables centralized control of network services and interfaces between video information providers and video information users. The transport of data throughout the centralized network is provided by the ATM backbone subnetwork, which enables broadband data and signaling communication between local video access nodes and network control systems and/or IMTV. Thus, the present invention is able to combine the respective advantages of centralized control processing and local distribution of video data for IMTV traffic.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A network for transporting compressed, broadband data to a plurality of users, said compressed, broadband data being received from a plurality of information providers on corresponding digital signal paths as asynchronous transfer mode ATM cell streams having corresponding VPI/VCI identifiers, the network comprising:

a broadcast consolidation section receiving signals from a first group of said digital signal paths and outputting a consolidated broadcast stream, said broadcast consolidation section comprising:

an ATM edge multiplexer receiving the respective ATM cell streams from said information providers and outputting a consolidated ATM cell stream, a digital encoder for converting analog signals into digital signals, and a transport multiplexer for multiplexing said consolidated ATM cell stream and said digital signals into said consolidated broadcast stream;

a transport ring for transporting said consolidated broadcast stream;

a plurality of video access nodes distributed along said transport ring, each of said video access nodes receiving said consolidated broadcast stream and outputting a consolidated RF signal, each of said video access nodes comprising:

a transport demultiplexer outputting said consolidated ATM cell stream and said digital signals from the received consolidated broadcast stream, means for recovering said compressed broadband data from said consolidated ATM cell stream output by said transport demultiplexer, the recovered compressed broadband data being output as a plurality of data packet streams, each data packet having an identifier value assigned as a function of the VPI/VCI of corresponding ATM cells, means for receiving local broadcast signals, means for recovering said analog signals from said digital signals output by said transport demultiplexer, means for modulating each of said data packet streams, the received local broadcast signals and the recovered analog signals to predetermined RF channel frequencies, respectively, a first RF combiner for combining modulated signals output by said modulating means into a consolidated RF signal, and means for outputting said consolidated RF signal onto at least one optical fiber; and a plurality of local video access nodes distributed throughout a service area, each of said local video access nodes receiving said consolidated RF signal and comprising:

(1) means for converting said consolidated RF signal on said optical fiber to an electrical consolidated RF signal, (2) means for providing interactive data for at least one of said users, said interactive data output by said providing means at an assigned RF channel frequency, (3) a second RF combiner for combining said electrical consolidated RF signal and said interactive data into a local RF signal; and (4) means for supplying said local RF signal from said local video access node to a plurality of said users including said at least one of said users.

2. A network as recited in claim 1, wherein each of said supplying means comprises an optical converter for outputting said local RF signal as a local optical signal, said network further comprising:

a plurality of coaxial cables;

at least one fiber node receiving said local optical signal on an optical fiber from said local video access node, said fiber node comprising an optical-to-electrical converter and a plurality of terminal amplifiers for outputting said local RF signal to said coaxial cables; and a coaxial drop cable coupled to a tap of one of said coaxial cables for servicing a customer premises of said at least one user.

3. The network as recited in claim 2, wherein said network further comprises a network interface module (NIM) coupled to said coaxial drop cable, said NIM adapted to store a deencryption key, said NIM receiving said local RF signal and supplying a deencrypted signal to a digital entertainment terminal (DET) of said at least one user.

4. The network as recited in claim 3, wherein said NIM comprises an RF tuner, said RF tuner outputting said compressed, broadband data from one of said information providers as deencrypted video-compressed data in MPEG-2 format.

5. The network as recited in claim 4, wherein said local video access node serving said at least one user supplies signaling data to said NIM on an out of band signaling channel within said local RF signal.

6. The network as recited in claim 5, wherein said NIM outputs said signaling data to a microprocessor of said DET.

7. The network as recited in claim 6, wherein said comprises a QPSK modulator outputting upstream signaling data from said DET to said local video access node in MPEG format at a predetermined RF channel.

8. The network as recited in claim 7, wherein said upstream signaling data in MPEG format comprises an identifier value corresponding to a user address of said DET.

9. The network as recited in claim 1, further comprising an ATM subnetwork adapted to transport said interactive data to said providing means of said local video access node corresponding to said at least one user.

10. The network as recited in claim 9, wherein said providing means comprises:

a demultiplexer for receiving optical signals from said ATM subnetwork and outputting an ATM stream carrying said interactive data;

means for recovering said interactive data from said ATM stream and outputting a plurality of data packet streams carrying said interactive data, each data packet having an identifier value assigned on the basis of said VPI/VCI of said corresponding ATM cell of said ATM stream;

a modulator for converting said data packet streams to an analog information signal carrying said interactive data; and a converter for mixing said analog information signal to said assigned RF channel frequency, said converter supplying said analog information signal at said assigned RF channel frequency to said second RF combiner.

11. The network as recited in claim 10, wherein each of said local video access nodes further comprise:

a demodulator for converting upstream RF signals from said at least one user at predetermined channels to upstream digital signaling data;

a network controller for assigning a destination to said upstream digital signaling data; and an ATM router for outputting said assigned upstream digital signaling data to said ATM subnetwork as an upstream ATM cell stream.

12. The network as recited in claim 11, wherein each of said local video access nodes further comprise an ethernet controller for supplying signaling data received from said ATM subnetwork via said ATM router to said network controller, said means for recovering said interactive data, and said modulator.

13. The network as recited in claim 11, wherein each of said local video access nodes further comprise means for supplying to said second RF combiner local-generated data for said at least one user on one of said RF channels and receiving from said RF splitter local signaling data generated by said at least one user.

14. The network as recited in claim 9, further comprising:

a permanent virtual circuit (PVC) controller coupled to said ATM subnetwork, said PVC controller establishing a virtual path for an ATM stream to be transported through said ATM subnetwork; and a level 1 gateway in communication with said ATM subnetwork, said level 1 gateway adapted to communicate with a selected one of said local video access nodes and an interactive information provider supplying said interactive data via said ATM subnetwork.

15. The network as recited in claim 14, further comprising a video data center comprising:

an ATM router for passing signals between said video data center and said ATM subnetwork;

an access subnetwork controller storing provisioning data for each of said local video access nodes, said supplying means, and said users serviced thereby, said access subnetwork controller assigning a communication channel from a specified local video access node to a specified user in response to a session request from said level 1 gateway; and encryption storage means, responsive to encryption requests from said access subnetwork controller, for downloading encryption keys to a network interface module (NIM) of said specified user.

16. The network as recited in claim 15, wherein said level 1 gateway outputs an activation request for a new subscriber to said access subnetwork controller via said ATM subnetwork, said access subnetwork controller in response thereto assigning a default RF downstream signaling channel for signaling to a DET address corresponding to said new subscriber, and a default RF upstream signaling channel for signaling from said DET address to said corresponding local video access node, said access subnetwork controller outputting an activation signal to said encryption storage means, said encryption storage means in response thereto assigning a NIM network address corresponding to said new subscriber and downloading a predetermined set of encryption keys via said ATM subnetwork.

17. The network as recited in claim 16, wherein said interactive data comprises signaling data and broadband data and said default RF downstream signaling channel comprises a 16 kbits/sec signaling capacity, said corresponding local video access node receiving downstream signaling data for said new subscriber via said ATM subnetwork.

18. The network as recited in claim 17, wherein said default RF upstream signaling channel transports a level 1 session request from said new subscriber to said corresponding local video access node, said local video access node outputting a level 1 gateway session request to said level 1 gateway via said ATM subnetwork, said level 1 gateway in response thereto outputting an ATM cell stream to said corresponding local video access node via said ATM subnetwork, said ATM cell stream from said level 1 gateway having a predetermined VPI/VCI value corresponding to a default virtual path, said recovering means and said converter of said corresponding local video access node converting said ATM cell stream from said level 1 gateway to an MPEG packet stream having a PID value and an assigned RF channel in accordance with said default RF downstream signaling channel, respectively.

19. The network as recited in claim 1, wherein said ATM edge multiplexer selectively deletes ATM cells from said supplied ATM cell streams in accordance with a predetermined VPI/VCI edge table.

20. The network as recited in claim 1, wherein said at least one user has a terminal adapted to access one of said packet streams on the basis of said corresponding identifier value.

21. A network for transporting video signals from a plurality of video sources to a plurality of video information users having digital entertainment terminals adapted to decode compressed data streams in accordance with stored connection block descriptors, the network comprising:

a first collection node for receiving first video signals and ATM cell streams carrying compressed video packets from a first group of said video sources, said first video collection node comprising at least one ATM edge device for grooming said ATM cell streams from said first group of video sources into condensed ATM cell streams, encoders for outputting first digital video signals in response to said first video signals, and an optical multiplexer receiving said condensed ATM cell streams and said first digital video signals and outputting an optical transport signal;

a plurality of optical fibers for carrying said optical transport signal;

a plurality of video node hubs, each comprising a drop-and-continue optical multiplexer that receives said optical transport signal on a corresponding incoming optical fiber and outputs said optical transport signal on a corresponding outgoing optical fiber, said video node hubs and said optical fibers coupled to said video node hubs being arranged to form a unidirectional broadcast ring, each of said video node hubs further comprising:

a plurality of ATM packet demultiplexers for reassembling said compressed video packets from the respective condensed ATM cell streams carried by said optical transport signal and outputting the reassembled compressed video packets on digital data streams, said reassembled compressed video packets each having reassigned identifier values in accordance with a predetermined provisioning, a plurality of modulators corresponding to said ATM packet demultiplexers for converting said digital data streams to corresponding first RF signals having specified channel bandwidths, a second collection node for receiving second video signals from a second group of video sources, said second collection node comprising RF modulators for modulating the received second video signals to second RF signals, and an RF combiner for combining said first and second RF signals into a hub RF signal;

a plurality of video end offices corresponding to each of said video node hubs, said video end offices corresponding to said each video node hub receiving said hub RF signal from the corresponding video node hub, each of said video end offices comprising:

a third collection node for receiving third signals from a third group of sources and subscriber signaling information, said third collection node outputting said third signals and subscriber connection block descriptors as compressed data streams and comprising RF modulators for modulating said compressed data streams to third RF signals, and an RF combiner for combining said hub RF signal and said third RF signals into an end office RF signal; and means for supplying said end office RF signals from said video end offices to corresponding video information users, a selected group of said video information users being able to selectively decode said compressed data streams in accordance with said subscriber connection block descriptors supplied to said selected group.

22. The network as recited in claim 21, further comprising an ATM subnetwork adapted to transport an interactive portion of said third signals, said subscriber signaling information and data signals from an information provider to said third collection node.

23. The network as recited in claim 22, further comprising:

a permanent virtual circuit (PVC) controller coupled to said ATM subnetwork, said PVC controller establishing a virtual path for an ATM stream to be transported through said ATM subnetwork; and a level 1 gateway in communication with said ATM subnetwork, said level 1 gateway adapted to establish communication between said third collection node and an interactive information provider supplying said interactive portion of said third signals via said ATM subnetwork.

24. The network as recited in claim 23, further comprising:

an access subnetwork controller storing provisioning data for each of said video end offices, said supplying means, and said users serviced thereby, said access subnetwork controller assigning a communication channel from a specified video end office to a specified user in response to a session request from said level 1 gateway; and encryption storage means, responsive to an encryption request from said access subnetwork controller, for downloading encryption keys to a network interface module (NIM) of said specified user.

25. The network as recited in claim 24, wherein said level 1 gateway outputs an activation request for a new subscriber to said access subnetwork controller via said ATM subnetwork, said access subnetwork controller in response thereto assigning a default RF downstream signaling channel for signaling to a DET address corresponding to said new subscriber, and a default RF upstream signaling channel for signaling from said DET address to said corresponding video end office, said access subnetwork controller outputting an activation signal to said encryption storage means, said encryption storage means in response thereto assigning a NIM network address corresponding to said new subscriber and downloading a predetermined set of encryption keys via said ATM subnetwork.

26. The network as recited in claim 25, wherein said interactive data comprises signaling data and broadband data and said default RF downstream signaling channel comprises a 16 kbits/sec signaling capacity, said corresponding video end office receiving downstream signaling data for said new subscriber via said ATM subnetwork.

27. The network as recited in claim 26, wherein said default RF upstream signaling channel transports a level 1 session request from said new subscriber to said corresponding video end office, said video end office outputting a level 1 gateway session request to said level 1 gateway via said ATM subnetwork, said level 1 gateway in response thereto outputting an ATM cell stream to said corresponding video end office via said ATM subnetwork, said ATM cell stream from said level 1 gateway having a predetermined VPI/VCI value corresponding to a default virtual path, said third collection node of said corresponding video end office converting said ATM cell stream from said level 1 gateway to an MPEG packet stream having a PID value and an assigned RF channel corresponding to said default RF downstream signaling channel.

28. The network as recited in claim 24, wherein said access subnetwork controller supplies to said ATM packet demultiplexers of said video node hubs said predetermined provisioning for said reassigned identifier values of said reassembled compression packets.

29. A network for transporting signals to a plurality of information users, comprising:

a broadcast provider interface for receiving a plurality of broadcast signals from a plurality of broadcast information providers, said broadcast provider interface comprising:

means for combining a first group of said broadcast signals into consolidated broadcast signals output as ATM cell streams, each cell having a specified VPI/VCI value, a digital encoder for encoding a second group of said broadcast signals into digital broadcast signals, and a multiplexer receiving said ATM cell streams and said digital broadcast signals and outputting multiplexed optical signals onto a unidirectional optical fiber;

a plurality of broadcast headend nodes, each of said broadcast headend nodes receiving said multiplexed optical signals on a input fiber and outputting said multiplexed optical signals on an output fiber and being arranged to form a broadcast ring with said broadcast provider interface, each of said broadcast headend nodes comprising:

an ATM converter for recovering said first group of broadcast signals from said ATM cell streams in accordance with said specified VPI/VCI values, a decoder for recovering said second group of broadcast signals from said multiplexed optical signals, receiver means for receiving a third group of broadcast signals, and a plurality of modulators for modulating said first, second and third group of broadcast signals into a combined RF signal having respective channel frequencies;

a plurality of video central offices arranged in groups, each group being served by a corresponding one of said broadcast headend nodes, each of said video central offices receiving said combined RF signal from said corresponding broadcast headend node and comprising:

means for receiving local broadcast signals and outputting said local broadcast signals at central office RF channel frequencies, a combiner for combining said local broadcast signals with the combined RF signal from the corresponding headend node to output a central office RF signal; and a local distribution network for supplying said central office RF signal for each of said video central offices to corresponding subscribers.

30. The network as recited in claim 29, further comprising an ATM subnetwork adapted to transport interactive data in an ATM stream from an interactive information provider to said combiner of said video central office corresponding to said at least one user, said combiner comprising an ATM cell converter to recover said interactive data from said ATM cell stream and to combine the recovered interactive data.

31. The network as recited in claim 30, further comprising:

a permanent virtual circuit (PVC) controller coupled to said ATM subnetwork, said PVC controller establishing a virtual path for an ATM stream to be transported through said ATM subnetwork; and a level 1 gateway in communication with said ATM subnetwork, said level 1 gateway adapted to communicate with a selected one of said video central offices and said interactive information provider via said ATM subnetwork.

32. The network as recited in claim 31, further comprising a video data center comprising:

an ATM router for passing signals between said video data center and said ATM subnetwork;

an access subnetwork controller storing provisioning data for each of said video central offices, said local distribution network, and said users serviced thereby, said access subnetwork controller assigning a communication channel from a video central office to a specified user in response to a session request from said level 1 gateway; and encryption storage, responsive to encryption requests from said access subnetwork controller, that downloads encryption keys to a network interface module (NIM) of said specified user.

33. In a network providing video services to a plurality of information users distributed throughout a serving area and comprising a broadcast network interface for receiving broadband data from a plurality of information providers, a plurality of video network hubs coupled to each other and said broadcast network interface via optical fibers, a plurality of video end offices arranged in groups served by a corresponding one of said video network hubs, said information users being arranged in groups served by a corresponding one of said video end offices, a method for transporting broadband data from a plurality of said information providers to said information users, comprising the steps of:

grooming a first group of received broadband data carried as ATM cell streams from said information providers to obtain groomed ATM data streams;

combining said groomed ATM data streams with a second group of received broadband data to obtain a consolidated broadband data stream;

outputting said consolidated broadband data stream from said broadcast network interface to each of said video network hubs;

in each of said video network hubs:

recovering the broadband data from said groomed ATM data streams carried by said consolidated broadband data stream, outputting the recovered broadband data at a first channel frequency range and said second group of said received broadband data carried by said consolidated broadband data stream at a second channel frequency range, combining the broadband data at said first and second channel frequency ranges with a third group of received broadcast data at a third channel frequency range to obtain a combined spectrum signal, and supplying said combined spectrum signal to the corresponding group of video end offices;

in each of said video end offices:

combining the supplied spectrum signal from the corresponding video network hub with a fourth group of received data at a fourth channel frequency range to obtain a combined video end office signal, and supplying said combined video end office signal to the corresponding group of information users.

34. The method as recited in claim 33, further comprising the step of supplying ATM cell streams in an ATM subnetwork carrying interactive data to at least one of said video end offices to be combined as at least a part of said fourth group of received data.

35. The method as recited in claim 34, further comprising the step of establishing with a permanent virtual circuit (PVC) controller a virtual path for an ATM stream to be transported through said ATM subnetwork.

36. A network comprising:

a broadcast provider interface receiving digital signals from a plurality of broadcast information providers, said broadcast provider interface comprising:

(1) means for combining ATM cell streams having specified VPI/VCI values and each containing one of the digital signals into a consolidated broadcast signal, and (2) means for optically transmitting the consolidated broadcast signal;

a plurality of broadcast headend nodes receiving the optically transmitted consolidated broadcast signal, each broadcast headend node comprising:

(i) at least one ATM converter receiving two or more ATM cell streams having specified VPI/VCI values and recovering two or more of the digital signals from the received ATM cell streams, (ii) at least two modulators, each modulator modulating a recovered digital signal onto an assigned channel, (iii) a combiner combining modulated channel signals from the modulators into a first combined spectrum signal, and (iv) means for optically transmitting the first combined spectrum signal;

groups of central offices, each group of central offices receiving the first combined spectrum signal from a broadcast headend node servicing the group, each central office comprising:

(a) means for producing at least one additional signal;

(b) a combiner combining the at least one additional signal with the received first combined spectrum signal to form a second combined spectrum signal, and (c) means for transmitting the second combined spectrum signal; and for each central office, a local distribution network transporting the second combined spectrum signal from that central office to a group of user terminals.

37. The network as recited in claim 36, further comprising an ATM subnetwork adapted to transport interactive data in an ATM cell stream from an interactive information provider to said combiner (b) of one of said central offices corresponding to said at least one user.

38. A network comprising:
 a broadcast provider interface receiving analog video signals from a first broadcast information provider and ATM cell streams having specified VPI/VCI values and carrying MPEG-encoded signals from a second broadcast information provider, said broadcast provider interface comprising:
  (1) means for combining said ATM cell streams into a multiplexed ATM cell stream;
  (2) at least one encoder digitally encoding said analog video signals into digitally-encoded video signals; and
  (3) means for combining said multiplexed ATM cell stream and said digitally-encoded video signals into an optically-transmitted consolidated broadcast signal;
 a plurality of broadcast headend nodes receiving the optically-transmitted consolidated broadcast signal, each broadcast headend node comprising:
  (i) at least one ATM converter receiving said ATM cell streams and recovering said MPEG-encoded signals from the received ATM cell streams,
  (ii) at least one decoder for recovering said analog video signals from said digitally-encoded video signals,
  (iii) at least two modulators, each modulator modulating one of the recovered signals from said optically-transmitted consolidated broadcast signal onto an assigned channel,
  (iv) a combiner combining modulated channel signals from the modulators into a first combined spectrum signal, and
  (v) means for optically transmitting the first combined spectrum signal;
 groups of central offices, each group of central offices receiving the first combined spectrum signal from a broadcast headend node servicing the group, each central office comprising:
  (a) means for producing at least one additional signal;
  (b) a combiner combining the at least one additional signal with the received first combined spectrum signal to form a second combined spectrum signal, and
  (c) means for transmitting the second combined spectrum signal; and
 for each central office, a local distribution network transporting the second combined spectrum signal from that central office to a group of user terminals.

39. The network as recited in claim 38, wherein said at least one encoder and said at least one decoder encode and decode at a rate of 45 MB/s, respectively.

* * * * *